United States Patent
Ide

(10) Patent No.: US 11,350,247 B2
(45) Date of Patent: May 31, 2022

(54) COMMUNICATIONS SERVER AND METHOD

(71) Applicant: SONY CORPORATION, Tokyo (JP)

(72) Inventor: Yuji Ide, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/040,666

(22) PCT Filed: Dec. 27, 2018

(86) PCT No.: PCT/JP2018/047998
§ 371 (c)(1),
(2) Date: Sep. 23, 2020

(87) PCT Pub. No.: WO2019/187441
PCT Pub. Date: Oct. 3, 2019

(65) Prior Publication Data
US 2021/0021968 A1 Jan. 21, 2021

(30) Foreign Application Priority Data
Mar. 30, 2018 (JP) .............................. JP2018-069790

(51) Int. Cl.
*H04W 4/08* (2009.01)
*H04L 12/18* (2006.01)
(Continued)

(52) U.S. Cl.
CPC ............. *H04W 4/08* (2013.01); *H04L 12/185* (2013.01); *H04L 51/066* (2013.01); *H04W 8/186* (2013.01)

(58) Field of Classification Search
CPC ........... H04W 4/06; H04W 4/08; H04W 8/18; H04W 8/183; H04W 8/186; H04W 8/22;
(Continued)

(56) References Cited

U.S. PATENT DOCUMENTS 6,246,873 B1 * 6/2001 Flowers .................. H04N 7/15
                                                                    348/E7.083
6,725,052 B1 * 4/2004 Raith .................... H04W 8/186
                                                                    455/518
(Continued)

FOREIGN PATENT DOCUMENTS

CA        2789228 A1    8/2011
CN      102812732 A    12/2012
(Continued)

OTHER PUBLICATIONS

International Search Report and Written Opinion of PCT Application No. PCT/JP2018/047998, dated Mar. 26, 2019, 09 pages of ISRWO.

*Primary Examiner* — Kevin D Mew
(74) *Attorney, Agent, or Firm* — Chip Law Group

(57) ABSTRACT

A communications server comprises a data receiver configured to receive status data indicating, for each communication terminal of a set of communication terminals, a current device status of that communication terminal; a terminal manager configured to assign each communication terminal of the set of communication terminals to one or more communication terminal groups in dependence upon the respective status data for that communication terminal; and a communications controller to control the transmission of communications data to each of the set of communication terminals in dependence upon the respective communication terminal group to which that communication terminal is assigned by the terminal manager.

18 Claims, 15 Drawing Sheets

(51) Int. Cl.
  *H04L 51/066* (2022.01)
  *H04W 8/18* (2009.01)
(58) Field of Classification Search
  CPC ........ H04W 8/24; H04W 8/245; H04L 12/16;
    H04L 12/18; H04L 12/1845; H04L
    12/185; H04L 51/066
  See application file for complete search history.

(56) References Cited

U.S. PATENT DOCUMENTS

| | | | | |
|---|---|---|---|---|
| 7,796,631 | B2* | 9/2010 | Sinnarajah | H04W 4/06 370/431 |
| 9,025,474 | B2* | 5/2015 | Abplanalp | H04W 8/18 370/252 |
| 2001/0023187 | A1* | 9/2001 | Wilhelm | H04W 4/06 455/518 |
| 2002/0181423 | A1* | 12/2002 | Chen | H04L 65/608 370/337 |
| 2003/0119560 | A1* | 6/2003 | Takatori | H04W 76/40 455/564 |
| 2004/0062264 | A1* | 4/2004 | Adams | H04L 51/36 370/432 |
| 2004/0127244 | A1* | 7/2004 | Matsumoto | H04W 8/26 455/517 |
| 2004/0162062 | A1* | 8/2004 | Lee | H04N 21/41407 455/414.3 |
| 2006/0221937 | A1* | 10/2006 | Olivier | H04H 20/57 370/352 |
| 2007/0201376 | A1* | 8/2007 | Marshall-Wilson | H04W 4/029 370/252 |
| 2010/0159976 | A1* | 6/2010 | Marocchi | H04W 8/186 455/519 |
| 2011/0195739 | A1 | 8/2011 | Deleus et al. | |
| 2012/0172083 | A1* | 7/2012 | Logalbo | H04W 8/186 455/525 |
| 2014/0120889 | A1* | 5/2014 | Shuman | H04W 76/45 455/416 |
| 2014/0241215 | A1* | 8/2014 | Massover | H04L 65/403 370/260 |
| 2014/0324973 | A1* | 10/2014 | Goel | H04L 67/16 709/204 |
| 2015/0304370 | A1* | 10/2015 | Maytal | H04L 12/185 370/260 |
| 2016/0261748 | A1* | 9/2016 | de Castro | H04W 4/08 |
| 2016/0360474 | A1* | 12/2016 | Arzelier | H04W 48/16 |
| 2017/0279971 | A1* | 9/2017 | Raleigh | H04L 63/0428 |
| 2019/0082304 | A1* | 3/2019 | Bestor | H04M 3/493 |

FOREIGN PATENT DOCUMENTS

| | | |
|---|---|---|
| EP | 2534859 A1 | 12/2012 |
| JP | 09-261343 A | 10/1997 |
| JP | 2013-519334 A | 5/2013 |
| KR | 10-2012-0125364 A | 11/2012 |
| RU | 2012136154 A | 3/2014 |
| WO | 2011/100120 A1 | 8/2011 |
| WO | 2014/098846 A1 | 6/2014 |

\* cited by examiner

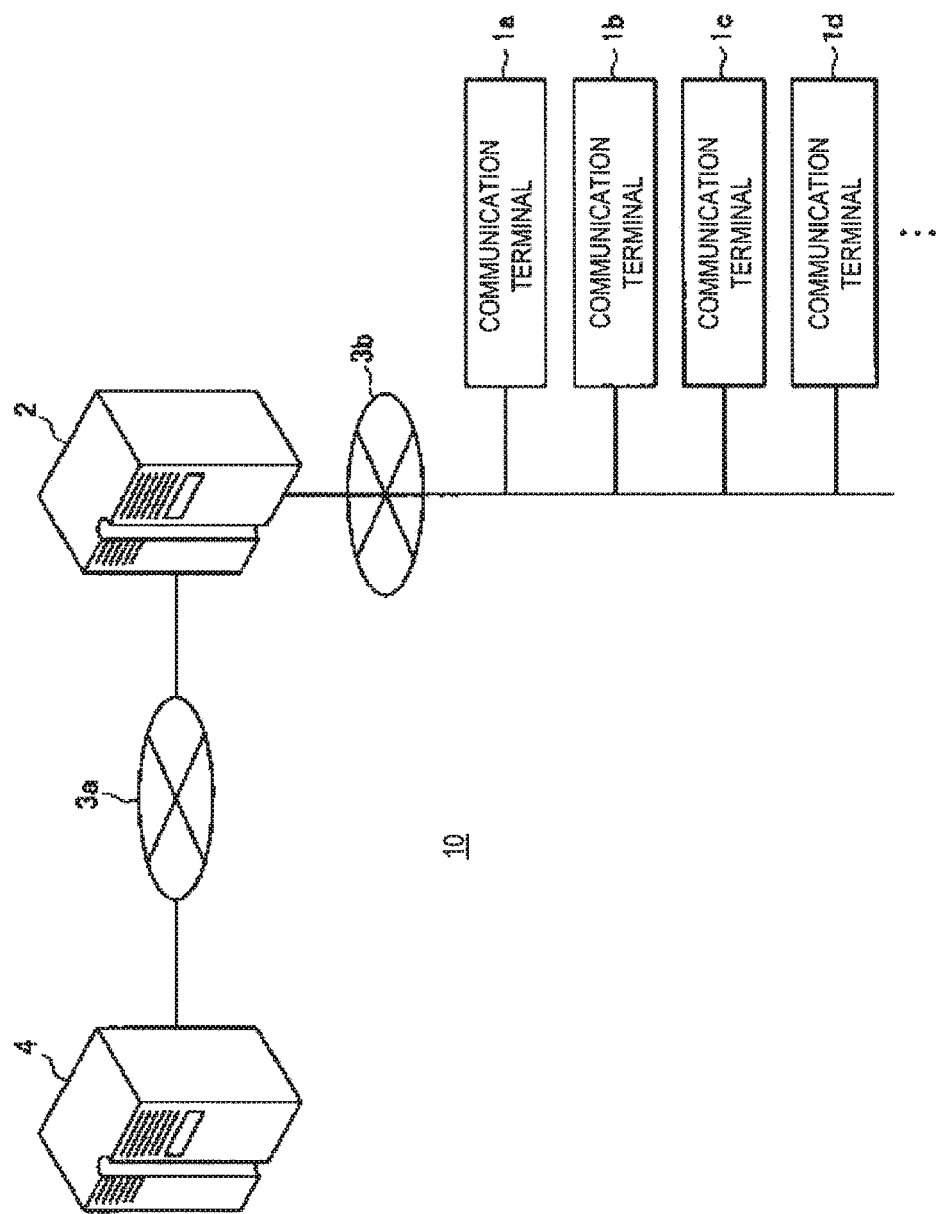
[FIG. 1]

[FIG. 2A]
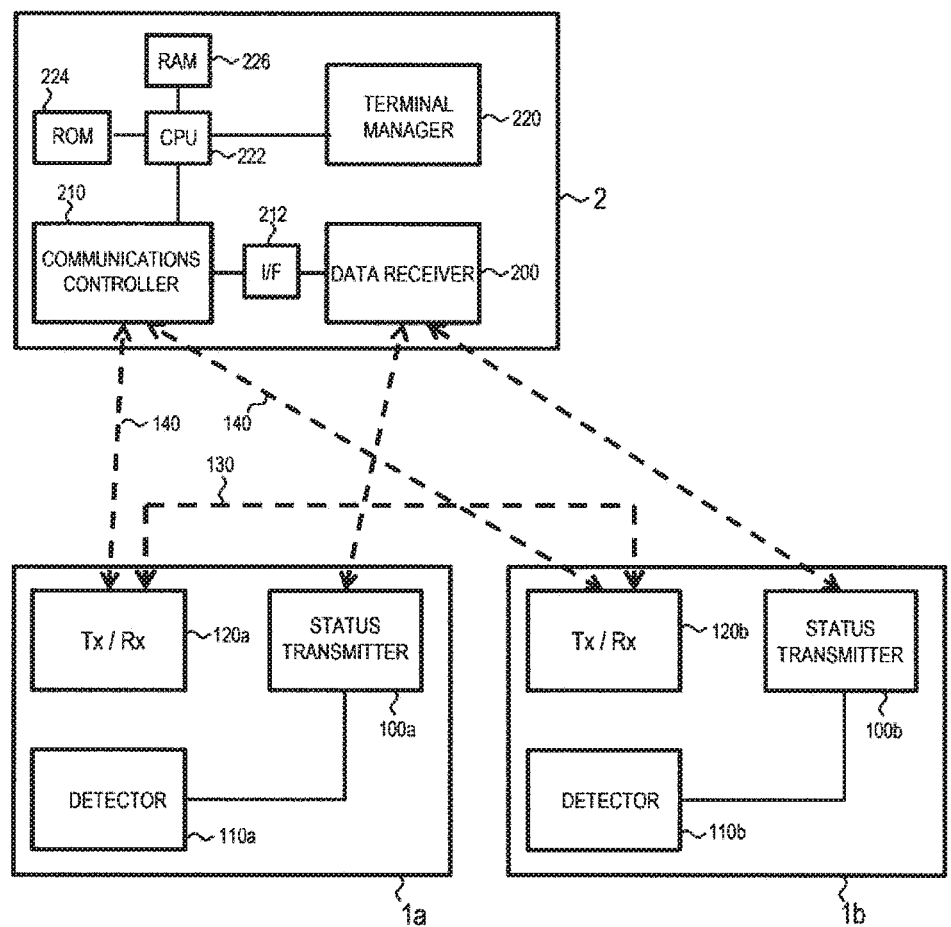
[FIG. 2B]
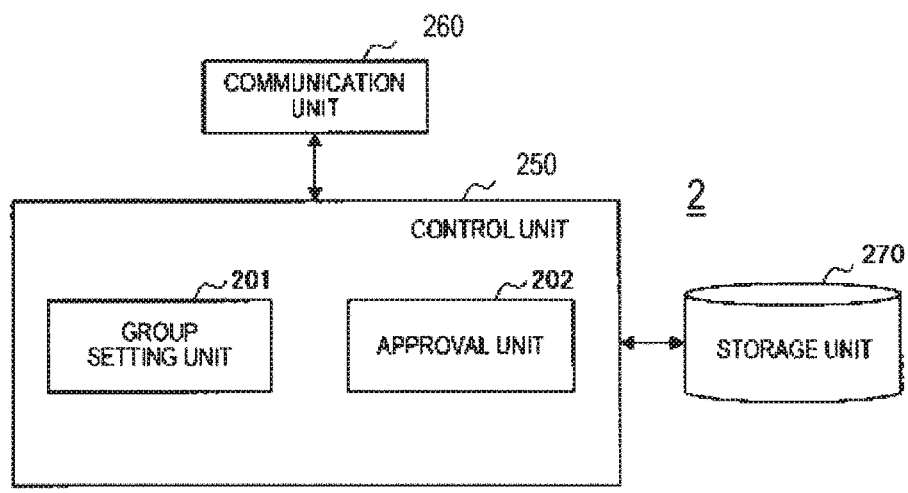

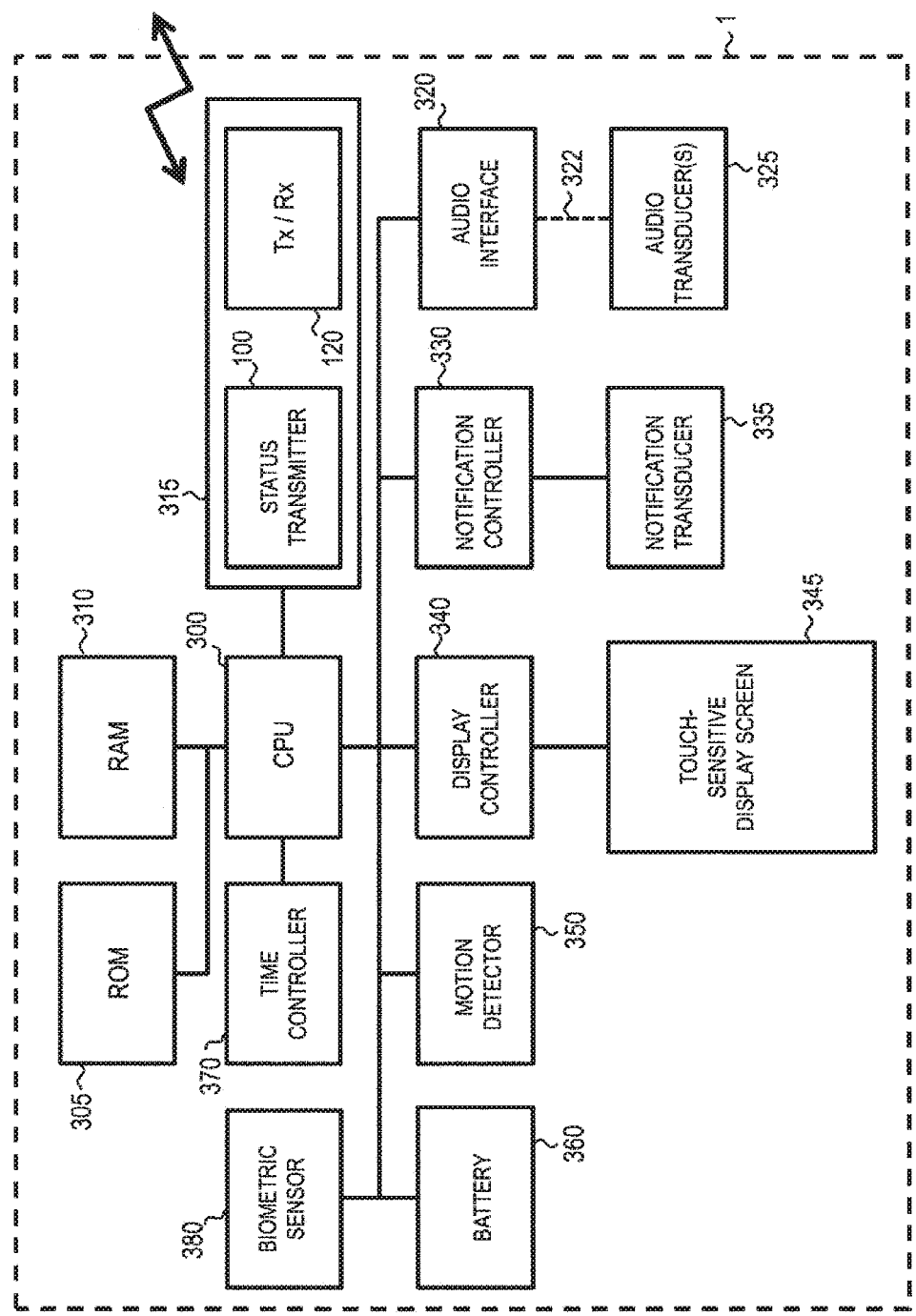
[FIG. 3]

[FIG. 4]
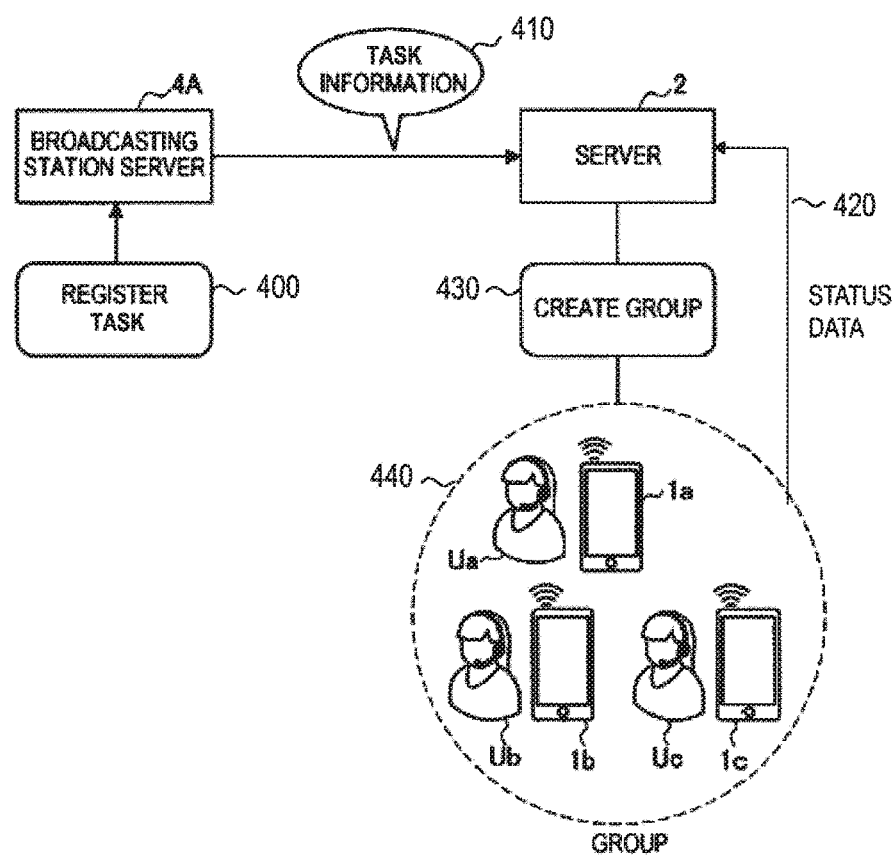

[FIG. 5]
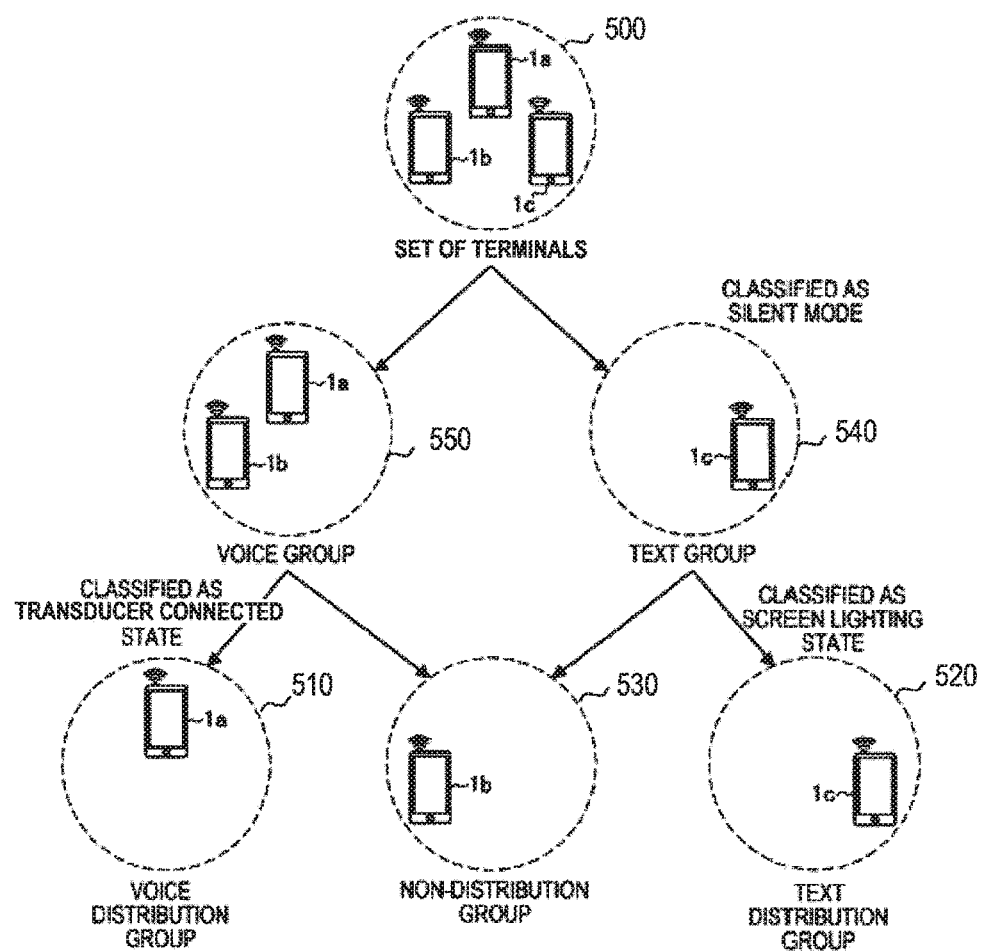

[FIG. 6]
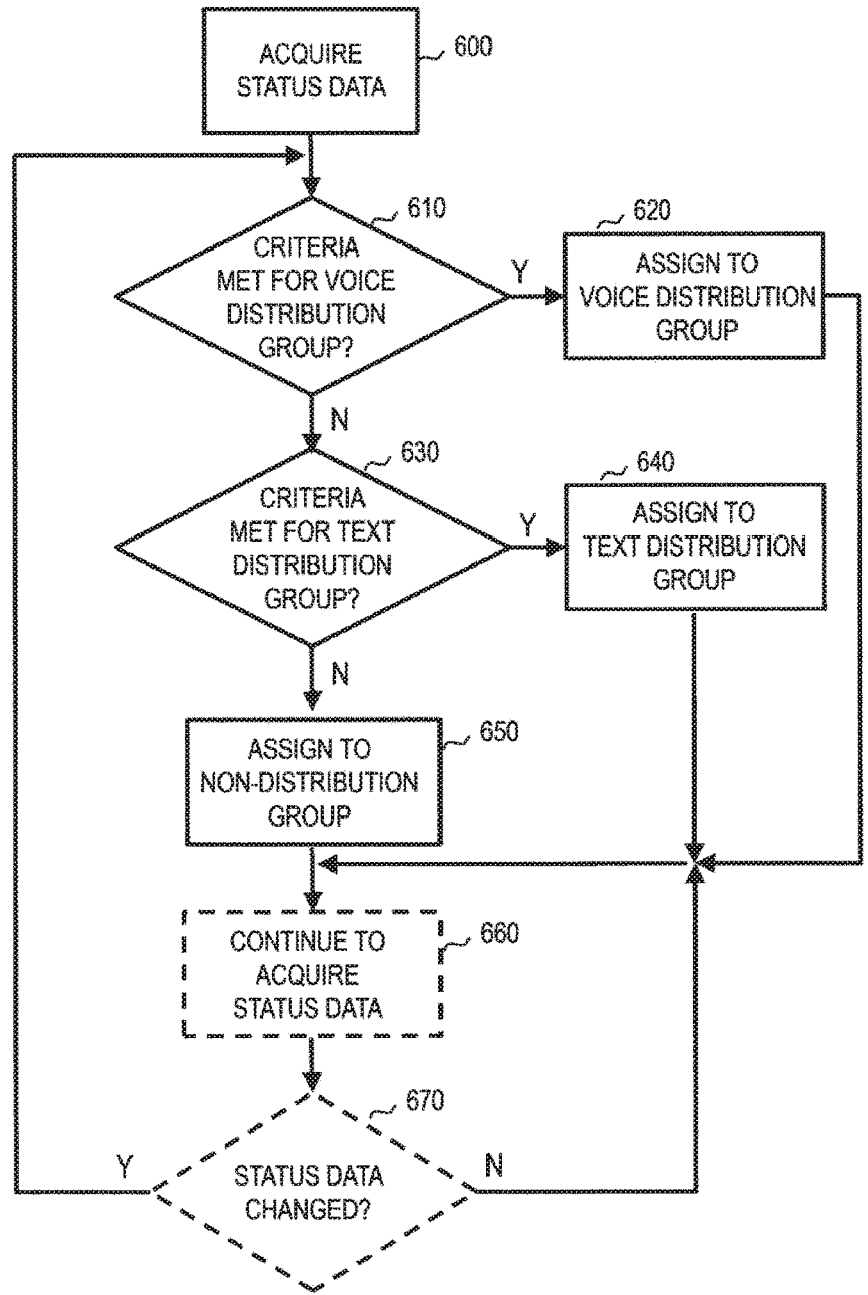
[FIG. 7]
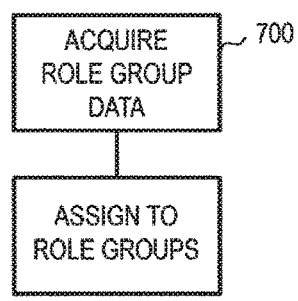

[FIG. 8A]
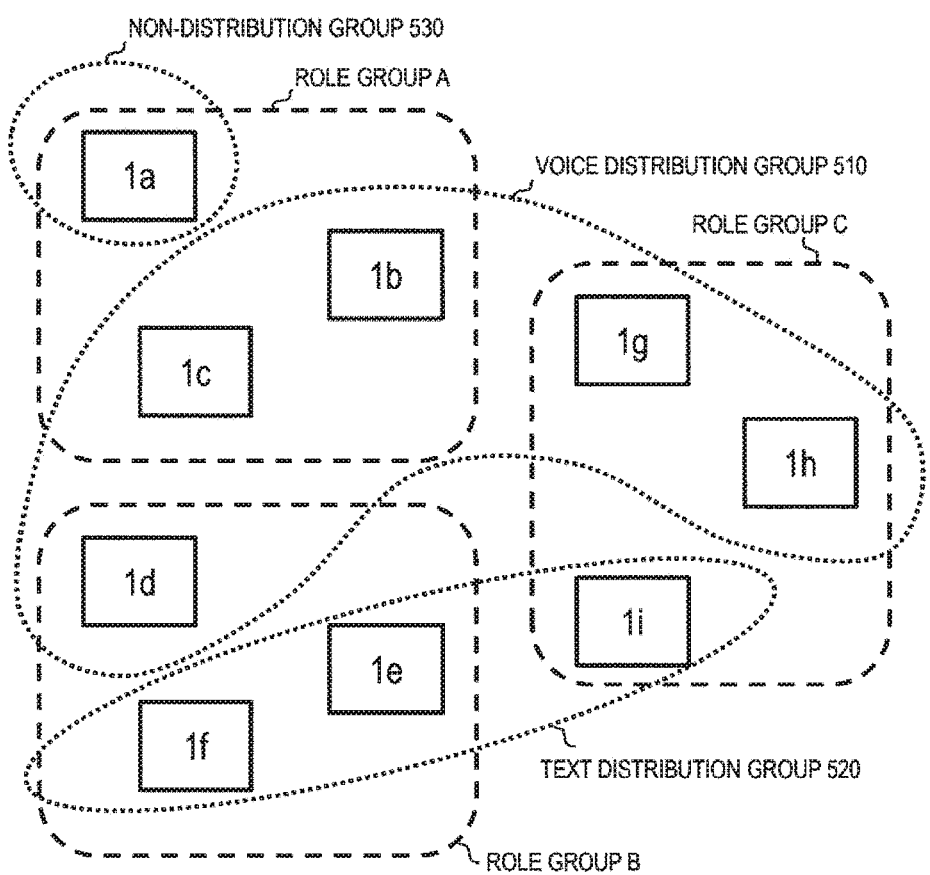

[FIG. 8B]
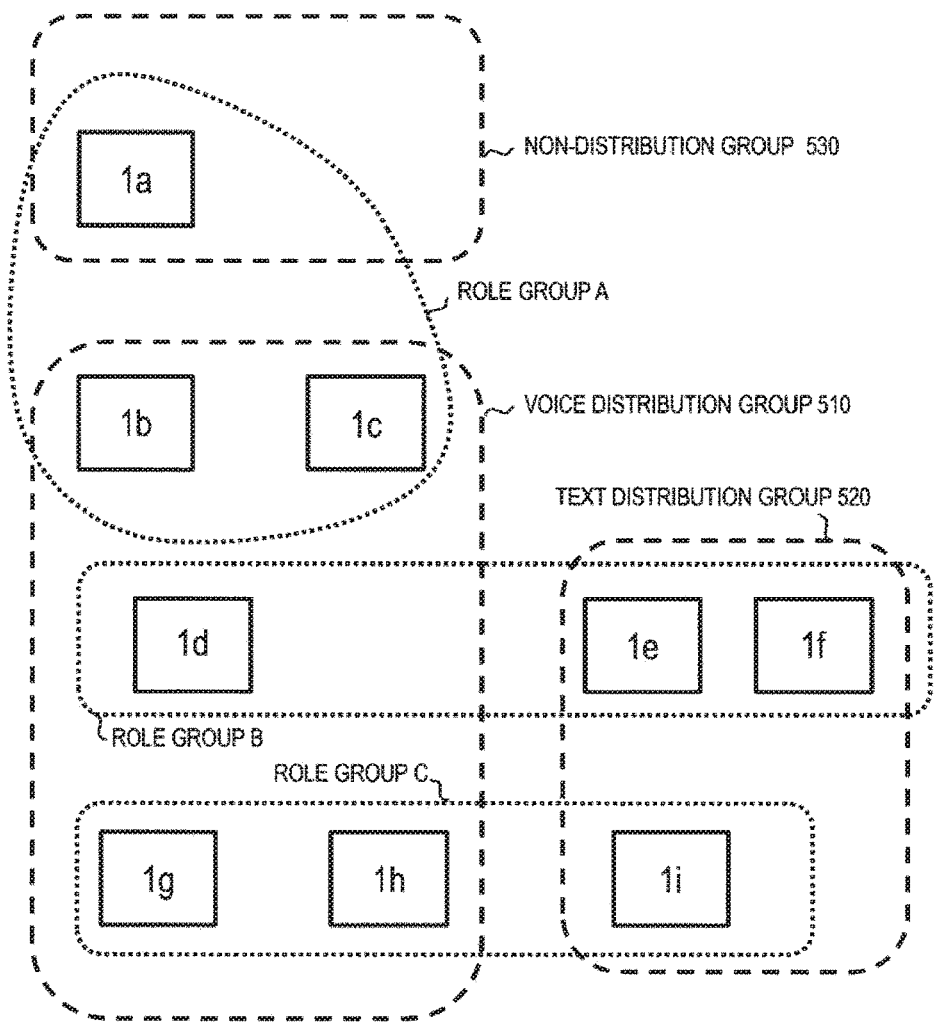
[FIG. 9]
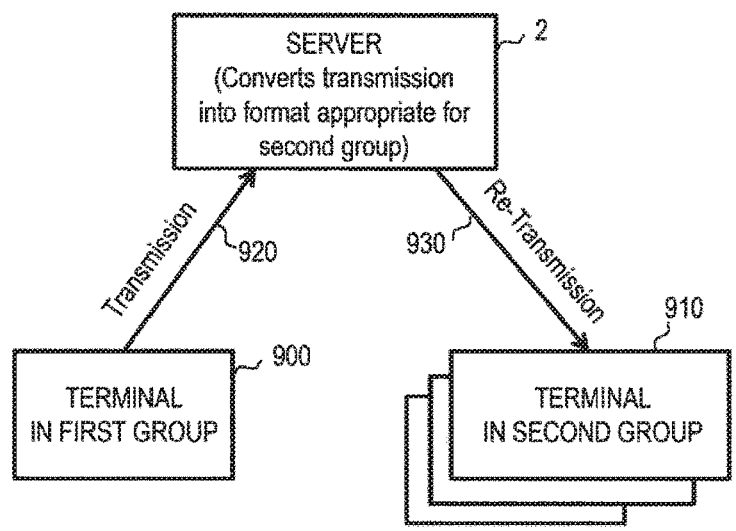

[FIG. 10]
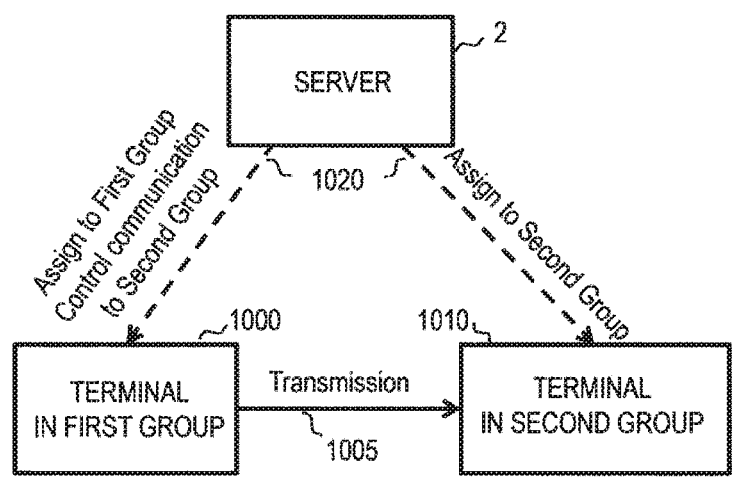

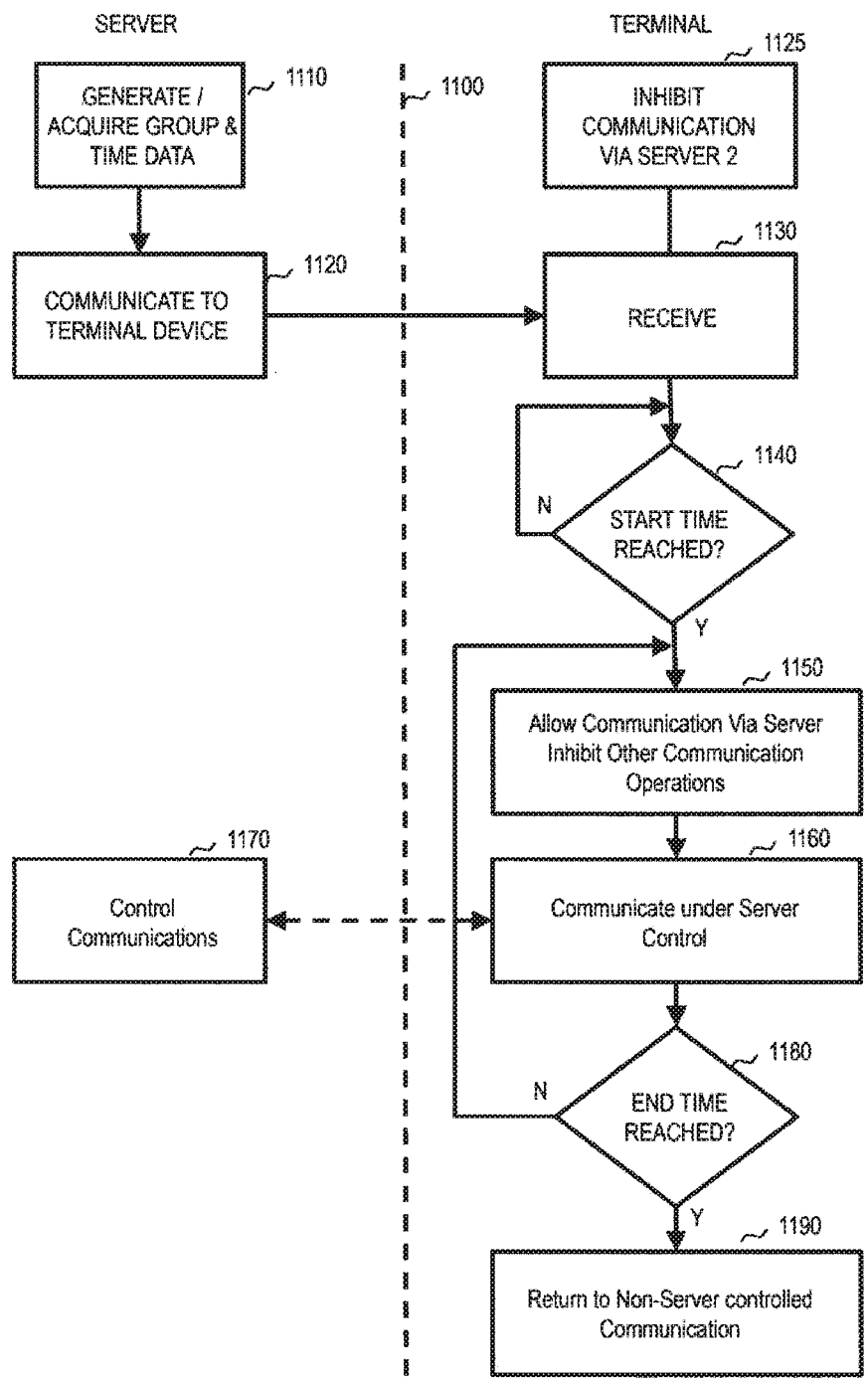

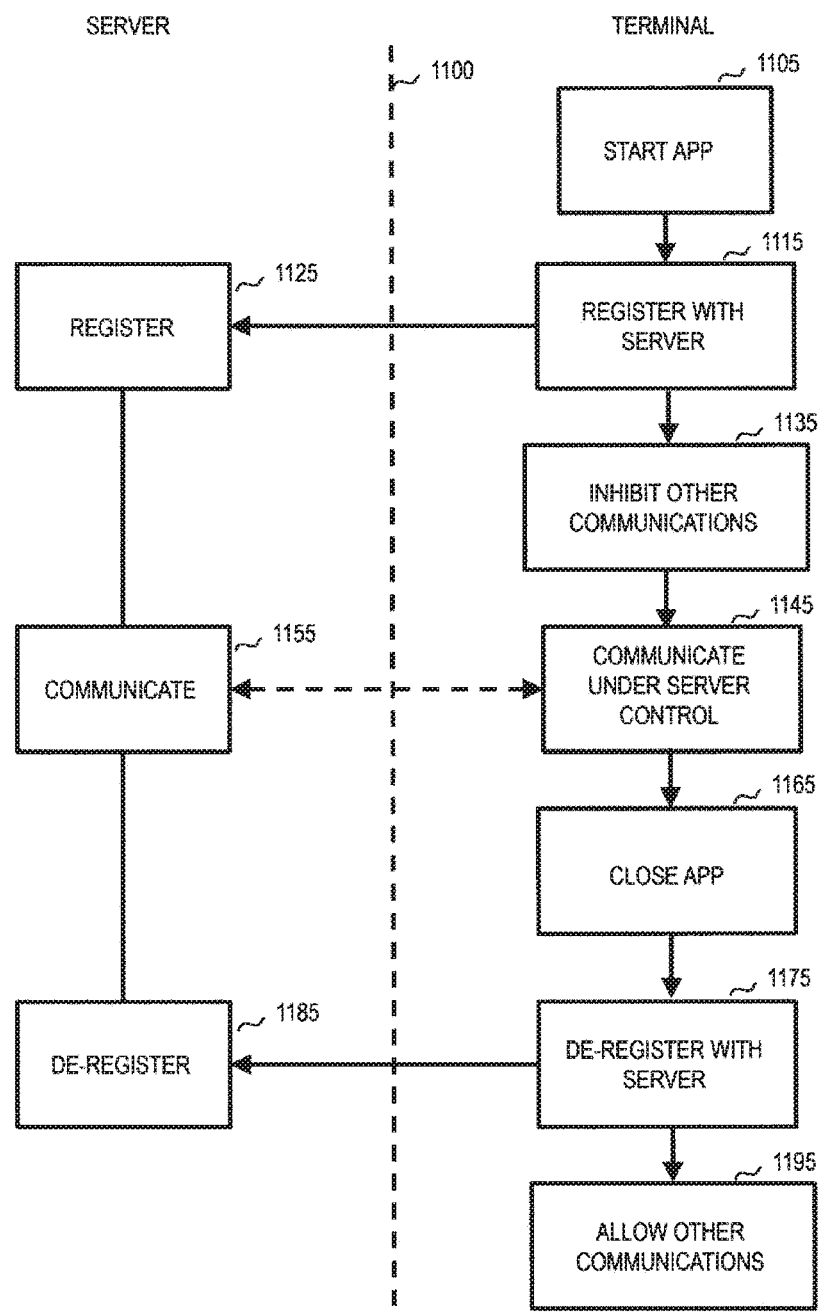

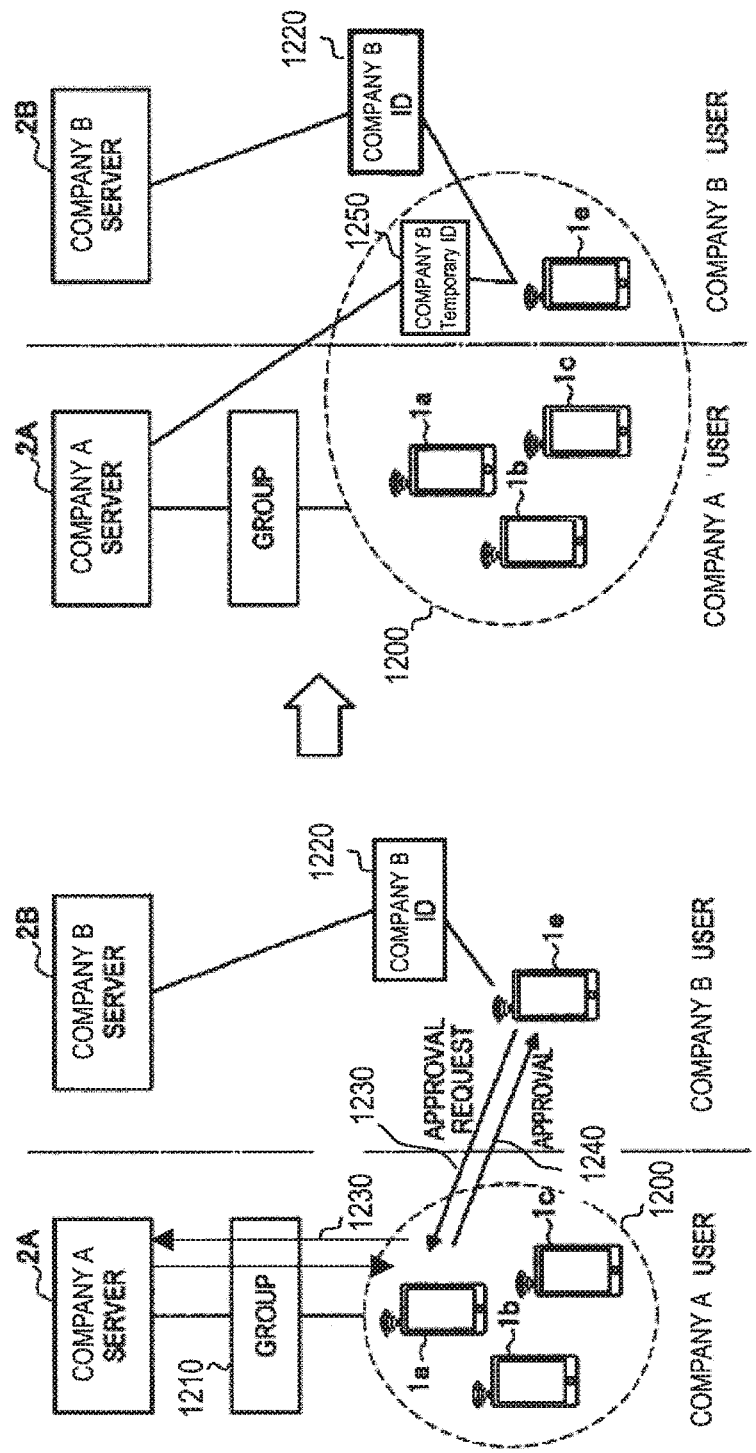

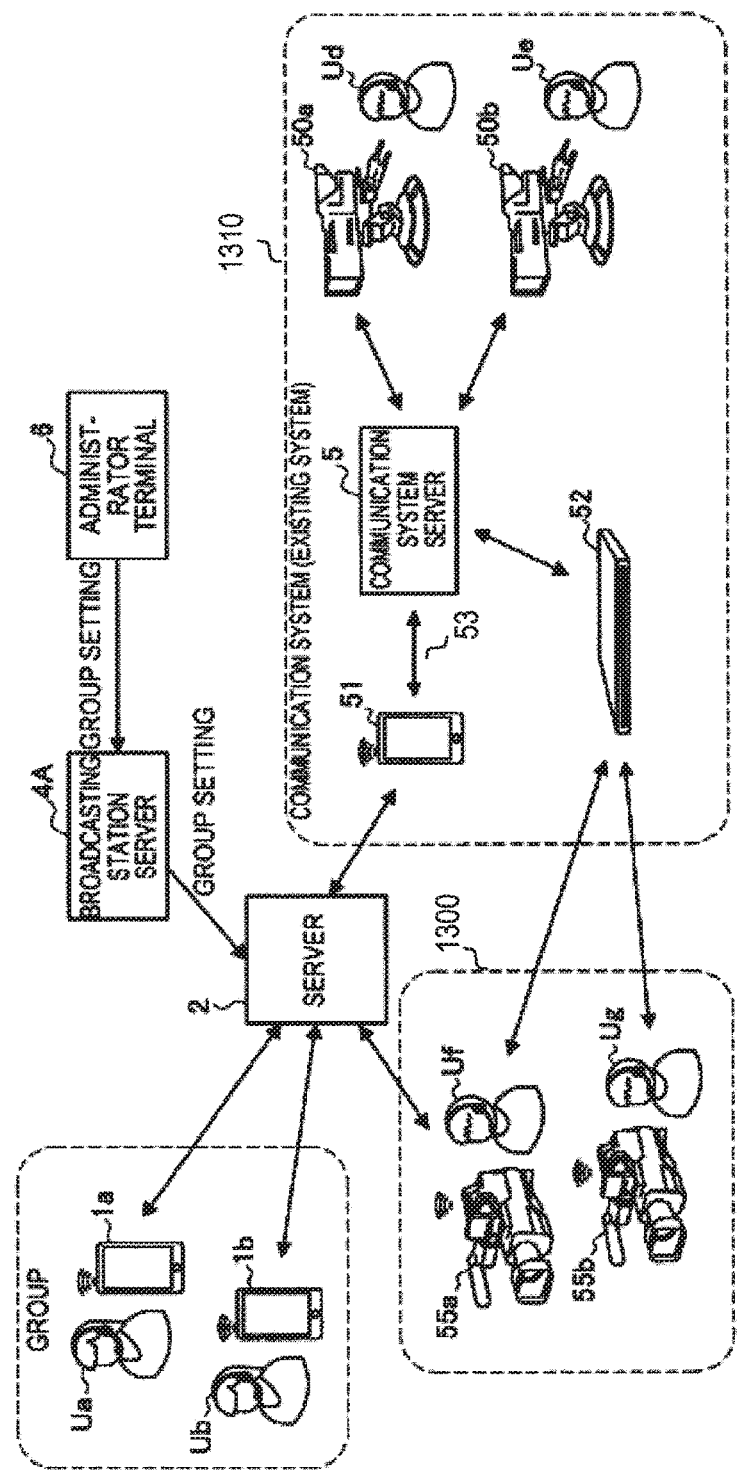
[FIG. 13]

[FIG. 14]
[FIG. 15]
[FIG. 16]
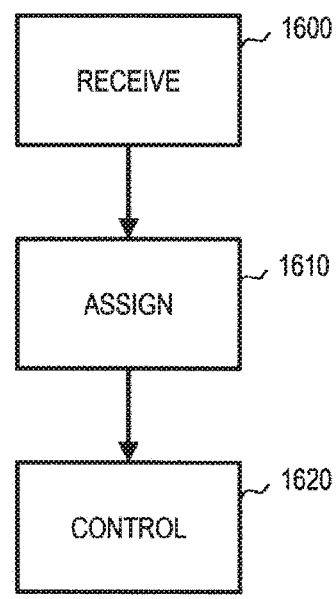

[FIG. 17]
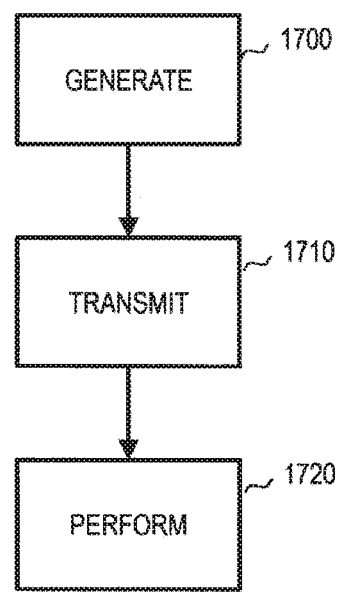

COMMUNICATIONS SERVER AND METHOD

CROSS REFERENCE TO RELATED APPLICATIONS

This application is a U.S. National Phase of International Patent Application No. PCT/JP2018/047998 filed on Dec. 27, 2018, which claims priority benefit of Japanese Patent Application No. JP 2018-069790 filed in the Japan Patent Office on Mar. 30, 2018. Each of the above-referenced applications is hereby incorporated herein by reference in its entirety.

TECHNICAL FIELD

This disclosure relates to communications servers and methods.

BACKGROUND ART

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

Communication systems for communicating between multiple users each having a communication terminal device are used in environments such as television broadcast studios and many other example environments (such as amongst co-workers, police officers or the like). Note that an application of this system is not limited to a broadcasting station, and can be performed in, for example, an event venue, a theme park, a store, a hotel, a construction site, between vehicles (such as communicating between multiple cars while driving in a friend group). It is not limited to use in business, and can also be used between friends and the like.

SUMMARY

Technical Problem

Many people carry their own terminal device in the form of a so-called smartphone. However, in the case of the type of medication system mentioned above, it is not always convenient to make use of an individual's smartphone. In the example situation of a television broadcast studio, it could be inappropriate for at least some users (for example, camera operators) to receive text messages or for other users (for example sound operators) to make or receive voice calls.

Solution to Problem

The present disclosure addresses or mitigates problems arising from these communication systems.

An example embodiment provides a communications server comprising:
 a data receiver configured to receive status data indicating, for each communication terminal of a set of communication terminals, a current device status of that communication terminal;
 a terminal manager configured to assign each communication terminal of the set of communication terminals to one or more communication terminal groups in dependence upon the respective status data for that communication terminal; and
 a communications controller to control the transmission of communications data to each of the set of communication terminals in dependence upon the respective communication terminal group to which that communication terminal is assigned by the terminal manager.

Another example embodiment provides a communications system comprising:
 a communications server as defined above; and
 a set of communication terminals each configured to receive communications data and to provide status data indicating a respective current device status to the communications server.

Another example embodiment provides a computer-implemented method of operation of a communications server, the method comprising:
 receiving status data indicating, for each communication terminal of a set of communication terminals, a current device status of that communication terminal;
 assigning each communication terminal of the set of communication terminals to one or more communication terminal groups in dependence upon the respective status data for that communication terminal; and
 controlling the transmission of communications data to each of the set of communication terminals in dependence upon the respective communication terminal group to which that communication terminal is assigned.

Another example embodiment provides a computer-implemented method of operation of a communication terminal, the method comprising:
 generating status data indicating a current device status of the communication terminal;
 transmitting the status data to the communications server; and
 performing communication with one or more other communication terminals via the communications server.

It is to be understood that both the foregoing general description and the following detailed description are exemplary, but are not restrictive, of the present technology.

BRIEF DESCRIPTION OF DRAWINGS

Embodiments of the present disclosure will now be described, by way of example only, with reference to the accompanying drawings.

FIG. 1 schematically illustrates a communication system.

FIG. 2A schematically illustrates a communications server communicating with a pair of communication terminals.

FIG. 2B schematically illustrates a communications server.

FIG. 3 schematically illustrates a communication terminal.

FIG. 4 schematically illustrates the establishment of a communication terminal group.

FIG. 5 schematically illustrates a grouping process.

FIG. 6 is a schematic flowchart illustrating respective grouping methods.

FIG. 7 is a schematic flowchart illustrating respective grouping methods.

FIG. 8A schematically illustrates overlapping groups.

FIG. 8B schematically illustrates overlapping groups.

FIG. 9 schematically illustrated communications between communication terminals under the control of a communications server.

FIG. 10 schematically illustrated communications between communication terminals under the control of a communications server.

FIG. 11A is a schematic flowchart illustrating a time-controlled communication process.

FIG. 11B is a schematic flowchart illustrating an application program-controlled communication process.

FIGS. 12A and 12B schematically illustrates a temporary assignment of a communication terminal to a group.

FIG. 13 schematically illustrates interaction of a communication system with a legacy communication system.

FIG. 14 schematically illustrates a text converter.

FIG. 15 schematically illustrates the interaction of a server with a smartphone application.

FIG. 16 is a schematic flowchart illustrating respective methods.

FIG. 17 is a schematic flowchart illustrating respective methods.

DESCRIPTION OF EMBODIMENTS

Referring now to the drawings, FIG. 1 schematically illustrates a communications system 10 comprising a communications server 2 connected by a network connection 3a to an (optional) configuration server 4 and by another network connection 3b to a set of communication terminals 1a ... 1d. This provides an example of a communications server 2 and a set of communication terminals 1 each configured to receive communications data and to provide status data indicating a respective current device status to the communications server.

The communication terminals 1 are associated with individual users having respective roles within a collective task. For example, the individual users could be operators collaborating towards the production of a television programme, police officers collaborating in the safe management of a large event, railway workers collaborating in the management of a railway station or the like. The precise nature of the roles associated with the individuals, or the precise nature of a collective task, are not significant to the technical aspects of the present disclosure.

The communication terminals 1 can communicate with one another (in order that the respective users may communicate with one another) using techniques to be discussed below and which are coordinated at least in part by the communications server 2. The communications terminals 1 may also have independent communication facilities, for example being so-called smartphones which can communicate with one another (or with fixed installations such as telephone landlines) via a mobile telephony interface.

In other examples, the terminals 1 may be, for example, a general-purpose information communication device such as a smart phone, a smart watch, a smart band, or a head mounted display (HMD). Each user can connect (wireless or wired connection) a headset, an earphone with a microphone, and the like to the information processing terminal 1, and perform simultaneous two-way communication of voice conversation.

FIG. 2A schematically illustrates an overview of the communication operations of the communications server 2 and (for the sake of this example) a pair of the communication terminals 1a, 1b.

The communications server 2 comprises a data receiver 200 configured to receive status data indicating, for each communication terminal of the set of communication terminals 1, a current device status of that communication terminal. In the present example, the status data is in fact directly provided to the data receiver 200 by a status transmitter 100a, b of each communication terminal 1, but in other examples, the status data could be provided by, for example, an intermediate further server device (not shown in FIG. 2A). Therefore, in the example of FIG. 2A, the data receiver 200 is configured to receive the status data for a given communication terminal 1 from the given communication terminal 1 itself.

The application server also comprises a communications controller 210 and a terminal manager 220. The terminal manager 220 is configured to assign each communication terminal 1 of the set of communication terminals to one or more communication terminal groups in dependence upon the respective status data for that communication terminal 1. The communications controller 210 is configured to control the transmission of communications data to each of the set of communication terminals in dependence upon the respective communication terminal group to which that communication terminal is assigned by the terminal manager 220. These features will be described further below.

Actual communication with the communication terminals 1 may make use of a wireless interface 212, for example configured to communicate data wirelessly using an IP packetised protocol, and operable to communicate with a similar interface (not shown in FIG. 2A but shown in FIG. 3 to be described below) at the communications terminals 1

In terms of the server 2, operations are controlled by a central processing unit (CPU) 222 associated with read only memory (ROM) 224 which acts as an example of a non-transitory machine-readable storage medium which stores program instructions of computer software which, when executed by the CPU 222 of the communications server 2 (as an example of a suitable computer to execute such program instructions) causes the communications server to perform a method as discussed below. The CPU 222 also accesses a random access memory (RAM) 226 in which to store a temporary copy of program instructions and/or data. The CPU 222 may in fact provide at least a part of the functionality of other circuitry in the server 2 shown in FIG. 2A.

At the communication terminals 1, as well as the status transmitter 100, a detector 110 (which may be implemented by a CPU of the communication terminal 1 as discussed below) is provided to generate the status data indicating the current device status of the communication terminal, and a communication transmitter and receiver (Tx/Rx) 120 is provided to perform communication with one or more other communication terminals. In some examples, this may be a direct communication as illustrated schematically by a broken line 130, or in other examples this may be communication 140 via the communications controller 210 of the communications server 2.

Accordingly, the example embodiments provide a technique for facilitating communication amongst a set of communication terminals 1 such as smartphones in situations where the appropriate means of communication to each terminal can vary according to the current status of the communication terminal or its user. The communications server 2 oversees the allocation of communication terminals to groups so that different communication parameters may be used for each group. So, rather than relying on the default and full communication capabilities of a terminal such as a smartphone, one or more subsets of such capabilities can be enabled for particular groups. For example, if a user is unable to or not minded to engage in a voice conversation but could still take part in a text-based conversation, this can be detected by the current status of the communication terminal and the terminal allocated into (for example) a text communication group such that only text communications are sent to and expected from that terminal. On the other hand, if a user has connected and audio transducer such as a headset, whether by a wired connection or a wireless connection, that user can be expected to take part in a voice-based conversation and so that particular terminal can be allocated to a voice communication group in which voice communications are sent to and expected from that terminal. Furthermore, by the detection of the current status of the communication terminal, some reassurance can be obtained that the user of that communication terminal is engaged in the current conversation.

In at least some example arrangements, the server 2 acquires information regarding group settings (which may be referred to as "group setting information" in this specification) from another system (for example, a server 4), and generates a group formed from a plurality of information processing terminals 1 on the basis of the group setting information. The server 2 controls (potentially simultaneous) two-way communication of voice conversation within such a group. For example, the server 2 performs control to distribute spoken voice transmitted in a group into the same group (at this time, it may not be distributed to a caller to prevent howling). Furthermore, the server 2 appropriately creates a sub-group included in the group in accordance with a (real-time) situation of each information processing terminal 1. That is, the server 2 divides the plurality of processing terminals 1 included in a group into sub-groups (such as a voice distribution group, a text distribution group, a non-distribution group, and the like to be described below) according to the (real-time) situation. The situations (status information) of the information processing terminals 1 may be information regarding a device state, sensing data, time, and the like. For example, as the information regarding a device state, a setting mode (a silent mode, an external speaker mode, a headset connection mode, or the like) of the information processing terminal 1, a display state (a lighting state of a display screen, what is displayed on a display screen (what application screen is in the foreground) and the like), a battery residual amount, and the like are assumed. In addition, as the sensing data, positional information of the information processing terminals 1 (such as positional information by indoor/outdoor position measurement), motion information (acceleration sensor data or gyro sensor data), analysis results of sensing data (walking, running, getting on a train, driving, and the like), a battery installation state of a user, a radio wave condition, and the like are assumed. The server 2 performs processing of dividing the plurality of information processing terminals 1 participating in a group into a plurality of sub-groups (having different distribution forms) included in the group in accordance with information related to these device states and status information such as sensing data and time. The server 2 may perform subdivision into a sub-group in accordance with the status information, and may also perform subdivision into a sub-group in accordance with an availability status of conversation estimated from the status information. In addition, the server 2 may also appropriately change a sub-group in accordance with the real-time status information of each information processing terminal 1 when conversation is performed in a group. Moreover, the server 2 may set and change a sub-group by combining the various types of status information described above.

As another view of the present techniques, FIG. 2B schematically illustrates a representation of the communications server 2, providing an example of an information processing apparatus comprising: a control unit 250 that acquires status information of a plurality of information processing terminals included in a group based on group setting information of voice conversation, and divides the plurality of information processing terminals into a plurality of sub-groups included in the group on a basis of the status information of each of the plurality of information processing terminals.

In addition, the control unit 250 can as a group setting unit 201 and an approval unit 202. The group setting unit 201 performs group setting (creation) of a terminal 1 on the basis of acquired group setting information in accordance with a request for group creation. Specifically, the group setting unit 201 registers an ID of an information processing terminal 1 participating in a group, a group name, start and end times, and the like, and creates a group. The group setting information may be information managed by another system, may be information in which an information processing terminal is directly designated by a user, and may also be user information such as a schedule. The information managed by another system may include, for example, programme information (including programme staff information) acquired from a system (the server 4) that manages information regarding recording and broadcasting of a broadcast programme within a broadcasting station, event information (including event staff information) acquired from a system that manages information of events held in a specific period, business information (including theme park staff information) acquired from a system that manages information regarding business of staff working at a theme park, and the like. The server 2 extracts, for example, the information regarding programme staff from the program information, and sets a group formed by the program staff (information processing terminals 1 used by the program staff). In addition, the server 2 can set a start time and an end time of two-way communication of voice conversation in the group based on the start and end times of a program. The control unit 250 starts distribution of voice conversation in a specific group formed by a plurality of registered information processing terminals 1 at a start time (for example, distribution can also be performed by IP packet communication). An application for using the present system can be started on sides of the information processing terminals 1. Note that distribution control of voice conversation may also be performed by another device. That is, the server 2 performs only group setting (ID registration) and subdivision of a group to be described below, and distribution of voice conversation according to group settings may be performed by another device (another server, a specific information processing terminal 1 within a specific group, or the like).

A communication unit 260 of the server 2 (for example, similar in function to the interface 212 and optionally a part of the communications controller 210) communicates with an external device by wired or wireless connection, and performs transmission and reception of data. The communication unit 260 may communicate with the network 3a,b by, for example, a wired/wireless Local Area Network (LAN), Wi-Fi (registered trademark), Bluetooth (registered trademark), a mobile communication network (Long Term Evolution (LTE)), or third generation mobile communication system (3G) or the like, communicate with another server (broadcasting station server 4A or the like) or the information processing terminal 1, and perform transmission and reception of data.

An approval unit 202 performs approval processing on a group for a participation request of an information processing terminal 1 belonging to another company or the like. For example, this system is assumed that various operators install the server 2 at a high cost. Each operator registers in-house information processing terminals 1 in the server 2 in advance. At this time, terminals not registered in this system, such as terminals registered in another company's system, are unable to participate in an in-house group, but by performing approval processing (for example, an issue of a temporary ID), it is possible to allow them to temporarily participate in an in-house group.

A storage unit 270 may be realized by a read only memory (ROM) that stores programs, calculation parameters, and the like used for processing of the control unit 250, and a random access memory (RAM) that temporarily stores parameters appropriately changing. For example, the storage unit 270 stores program information (an example of the group setting information) and information regarding a created group. The group information also includes information regarding a group that is appropriately subdivided.

FIG. 3 provides a more detailed schematic diagram of a communication terminal 1 in which operations are controlled by a central processing unit (CPU) 300 associated with read only memory (ROM) 305 which acts as an example of a non-transitory machine-readable storage medium which stores program instructions of computer software which, when executed by the CPU 300 of the communication terminal 1 (as an example of a suitable computer to execute such program instructions) causes the communication terminal to perform a method as discussed below. The CPU 300 also accesses a random access memory (RAM) 310 in which to store a temporary copy of program instructions and/or data.

A wireless interface 315, for example configured to communicate data wirelessly with the interface 212 using an IP packetised protocol, acts as at least an interface portion of the status transmitter 100 and the transmitter/receiver 120, to communicate with the transmitter/receiver 120 of another communication terminal, the communications controller 210 of the server 2 and/or the data receiver 200 of the communications server 2.

Also connected to the CPU 300 and configured so as to provide status data are:

- an audio interface 320 connectable via a connectable wired or wireless (for example Bluetooth (Registered trademark)) interface 322 to one or more audio transducers 325. The audio interface 320 is configured to provide its current connection status (in other words, whether an external audio transducer is currently connected to handle audio signals for the given communication terminal, or is/are the audio transducer(s) 325 currently connected to the audio interface 320 by the connectable interface 322) to the CPU 300 in its role as the detector 110. Moreover, a wearing state of a headset can be recognized, for example, on the basis of data detected by a proximity sensor, a biosensor, or the like provided on the headset and communicated as status data;
- a notification controller 330 associated with one or more notification transducers 335 operable to generate a notification to a user of the communication terminal 1, for example when a voice call or a text message is received. For example, the notification transducers 335 may be configured to perform one or more of: vibration, audio alert (for example, a ring tone), flashing a light or a screen display, or the like. The selection of a notification mode is under the control of the notification controller 330 which again is configured to communicate its current notification mode status (a current notification mode indicating the handling of user notifications by the given communication terminal) to the CPU 300;
- a display controller 340 configured to control a touch-sensitive display screen 345 acting as a user interface by which information can be displayed to the user of the communication terminal 1 and by which control input, text messages, or other information can be provided to the communication terminal 1 by the user of the communication terminal 1. The display controller 340 is configured to selectively place the display in one of a locked state in which (apart from execution of a "display unlock" command) the input of information by user to the touch-sensitive display screen is inhibited, and an unlocked state in which the user is free to input information via the touch-sensitive display screen 345. The display controller 340 is configured to communicate the locked/unlocked status (whether a display screen of the given communication terminal is currently in a locked state or an unlocked state) to the CPU 300; the display controller can also communicate a current screen illumination (screen lighting) state to the CPU 300, for example as a "screen is currently illuminated" or "screen is currently not illuminated" status. Note that the test of "illuminated" or note could in principle lead to rapid changes in the device status of a terminal 1. In such arrangements a delay period (as discussed in connection with FIG. 6) or a locking mechanism (again discussed with reference to FIG. 6) between group reassignments may be useful;
- a motion detector 350 such as an accelerometer, a gyroscopic motion detector, a satellite positioning system (for example, GPS) receiver, a vibration detector or the like. The motion detector 350 is configured to communicate a current motion detection status to the CPU 300;
- a battery 360 providing a power source for operation of the communication terminal 1. The battery 360 is configured to communicate its current charge level to the CPU 300;
- a time controller 370 configured to provide at least a current time signal to the CPU 300; and
- a biometric sensor 380 such as a detector to detect a pulse rate, skin conductivity, skin temperature or the like of a user holding the communication terminal. For example, the terminal status can be detected and communicated as a device state, behaviour recognition information of a user (getting on a train, walking, sitting, driving, and the like), biological information of a user (heart rate, body temperature, perspiration, blood pressure, perspiration, pulse, respiration, blink, eye movement, fixation time, magnitude of pupil diameter, blood pressure, electroencephalogram, body movement, body position, skin temperature, micro vibration (MV), myoelectric potential, blood oxygen saturation (SpO2)), emotion information (which can be generated on the basis of biological information and behaviour recognition information), a posture of a user, positional information, surrounding environmental information (illuminance, place, behaviour history, circumstances, time, altitude, temperature, wind direction, wind volume, and the like), and the like, so as to set the information processing terminal 1 to appropriate subgroups using at least one of these pieces of sensing data. Note that, as various sensors, for example, a gyro sensor, an acceleration sensor, a geomagnetic sensor, a biosensor (heart rate, body temperature, blood pressure, perspiration, pulse, respiration, blood pressure, electroencephalogram, body movement, body position, skin temperature, skin electric resistance, micro vibration (MV), myopotential, or blood oxygen saturation (SpO2)), positional information acquisition unit such as a Global Navigation Satellite System (GNSS), an illuminance sensor, a barometric pressure sensor, a camera, a temperature (air temperature) sensor, an altitude sensor, and the like are provided in the information processing terminal 1 and a headset.

In at least some of the above examples, for example those relating to the audio interface 320, the notification controller 330 and the display controller 340, the current device status comprises, for the given communication terminal, at least a current data output capability (in terms of audio data, notification information and display information) of a user interface of the given device.

As mentioned above, the CPU 300 acts as the detector to generate status data indicative of a current status of the communication terminal 1. The status data may comprise data indicating one or more of:

- a connection status relating to the connectable interface 322;
- a notification status (for example, whether the communication terminal is in a so-called "silent" mode, discussed below);
- a display screen locked/unlocked and/or illuminated/not illuminated status;
- a motion detection status (for example, is the communication terminal 1 currently in motion at a threshold velocity and/or acceleration?);
- a battery charge level status (for example, does the battery currently hold at least a threshold charge level?);
- a user biometric detection status (for example, is the user's pulse over a threshold, and/or is the user's skin temperature over a threshold, and/or is the user's skin conductivity over a threshold?).

The CPU 300 generates the status data and provides it to the status transmitter 104 communication to the indications server 2 by the wireless interface discussed above.

In a particular example of a set of users U (FIG. 4) having associated communication terminals 1 being workers or operators associated with a broadcasting station or studio environment, the collective task mentioned above may be the production of a television programme or the like. In an overview of some aspects of the operation of the systems described above, FIG. 4 schematically illustrates a broadcasting station server 4A as an example of the configuration server 4 of FIG. 1, at which information 400 relating to a particular collective task such as the production of a broadcast program, and the roles of users involved in that task, is registered and task information 410 is provided to the communications server 2. In response at least to the status data 420 received from the communication terminals 1 and (optionally) to the task information 410 provided by the broadcasting station server 4A, the communications server 2 creates 430 one or more groups of the communication terminals 1. An example group 140 is shown in FIG. 4.

In other examples, an information processing terminal 1 can be used for two-way communication according to the present embodiment only while being in specific places such as an event venue, a theme park, a company, and the like (only during work), and can be made not to be able to participate in voice conversation in a case of being away from the specific places such as during a break or commutation. Specifically, an information processing terminal 1 can be set to a non-distribution group in a case in which a position of the information processing terminal 1 is away from the specific places, and to a voice or text distribution group when the position thereof returns within the specific places.

The nature and purpose of the groups will be described further below, but a more detailed example of the grouping process is provided in FIG. 5.

In FIG. 5, the set 500 of communication terminals is categorised by the terminal manager 220 according to whether each terminal is in a so-called "silent" mode. Here, a "silent" mode refers to a mode using only one or both of visual and vibrational notifications (under the control of the notification controller 330), or in other words, not using audible (ring tone) types of notifications. It is noted that in some circumstances a vibrational notification can in fact be heard, but the skilled person will understand that the term "silent" as used here encompasses the use of vibrational notifications in the context of communication terminals.

The communication terminals 500 are categorised into a voice distribution group 510, a text distribution group 520 and a non-distribution group 530. This categorisation involves detecting whether a communication terminal is in a silent mode as discussed above or not. If the communication terminal is in the silent mode then it is allocated to an intermediate text group 540 and if not, to an intermediate voice group 550. In the intermediate text group 540, if the display screen is currently illuminated then the communication terminal is allocated to the text distribution group 520; if not then the communication terminal is allocated to the non-distribution group 530. In the intermediate voice group 550, if the communication terminal is currently connected to an audio transducer such as a headset then the communication terminal is allocated to the voice distribution group 510; if not then the communication terminal is allocated to the non-distribution group 530.

For terminals in the voice distribution group 510, user communications are exchanged (under the control of the server 2) with those terminals as audio or voice communications. this is an example of the assignment of a communication terminal to a communication terminal group to which audio communications are transmitted, when the status data indicates that an external audio transducer is currently connected to handle audio signals for the given communication terminal.

For terminals in the text distribution group 520, user communications are exchanged (under the control of the server 2) with those terminals as textual or text message communications. This is an example of the assignment of a communication terminal to a communication terminal group to which textual communications are transmitted, when the status data indicates that the current notification mode is a mode using only one or both of visual and vibrational notifications and that the display screen of the given communication terminal is currently unlocked.

For terminals in the non-distribution group 530, no user communications are exchanged (under the control of the server 2) with those terminals. Note however that the communication terminals can still interact with the server, for example to provide updated status data. This is an example of the terminal manager being configured to assign the given communication terminal to a non-distribution group to which communications are not transmitted when the status data indicates that an external audio transducer is not currently connected to handle audio signals for the given communication terminal and that the display screen of the given communication terminal is currently locked.

Note that the intermediate stage of group allocation shown in FIG. 5 (involving the intermediate text and intermediate voice groups) is merely drawn for the purposes of convenient explanation. The actual allocation to a group may be a single-stage process not involving an allocation to (or even the existence of) such an intermediate group.

Having said this, in other example embodiments the groups 540, 550 refers to above as "intermediate" groups could in fact be the destination groups of the sub-division process, so that instead of division into three groups 510, 520, 530, the effective division is into either a voice group 550 or a text group 540, on the basis of (for example) whether or not an individual terminal 1 is currently in a silent mode.

In the example of FIG. 5, the terminal manager 220 is therefore configured to assign each communication terminal to a single communication terminal group selected from a set of two or more candidate communication terminal groups 510, 520, 530. For example, the groups could be (as shown in FIG. 5) mutually exclusive. However, in other examples, it could be envisaged that a communication terminal could be assigned to multiple groups having mutually compatible communication properties.

Instead of, or in addition to, the criteria mentioned above, the status data may indicate, for the given communication terminal, whether a battery of the given communication terminal has at least a threshold charge level; and the terminal manager 220 may be configured to assign the given communication terminal to the non-distribution group, when the status data indicates that the battery of the given communication terminal has less than the threshold charge level.

Instead of, or in addition to, the criteria mentioned above, the status data may indicate, for the given communication terminal, whether the given communication terminal is in motion; and the terminal manager 220 may be configured to assign the given communication terminal to the communication terminal group to which textual communications are transmitted, when the status data indicates that whether the given communication terminal is in motion.

Instead of, or in addition to, the criteria mentioned above, the status data may indicate, for the given communication terminal, a biometric property detected for a user of the given communication terminal; and the terminal manager 220 may be configured to assign the given communication terminal to a group selected in response to the detected biometric property of the user.

FIG. 6 is a schematic flowchart illustrating a method of allocating communication terminals to the groups discussed above.

At a step 600, status data is acquired from a given communication terminal 1.

If, at a step 610, the criteria are met for the voice distribution group 510 then at a step 620 the given communication terminal 1 is assigned to the voice distribution group by the terminal manager 220. Control passes to a step 660.

If not, control passes to a step 630. At the step 630, if the criteria are met for the text distribution group 520 then at a step 640 the given communication terminal 1 is assigned to the text distribution group 520 and control passes to the step 660.

If the outcome of the step 630 is also negative then control passes to a step 650 at which the communication terminal is assigned to the non-distribution group 530.

Note that the steps 610, 620, 630 are shown as a serial arrangement in FIG. 6, but they could of course be conducted in a different order or in parallel.

Then, at the step 660, which represents an optional ongoing monitoring operation, the communications server 2 continues to acquire status data from the given communication terminal 1. If, at a step 670, the status data has changed since the last acquisition of status data then control returns to the step 610 by which the communication terminal 1 may be re-assigned to a potentially different group. If not, then monitoring continues at the step 660.

In other example embodiments, the step 660 can be replaced by a simple "process ends" step.

Optionally, the path via the steps 660, 670 and back to 610 may comprise a delay period (as an example of a low-pass filtering operation) so as to avoid excessively rapid reassignments amongst the groups 510, 520, 530. For example, such a delay may be a delay of 30 seconds.

Optionally (as an alternative or in addition to such a delay period) a so-called locking mechanism may be used so as to inhibit a change or reassignment of groups during one or both of (i) an individual communication such as a voice transmission and (ii) a conversation (for example defined as a succession of communications between a set of two or more parties with less than a threshold gap (such as 15 seconds) between successive communications).

Therefore, the continuous monitoring discussed above with reference to the step 660 provides example in which the terminal manager 220 is configured to detect a change in the status data for the given communication terminal and (where appropriate) to change the assignment of the given communication terminal in response to the detected change in the status data.

The assignment to groups discussed so far relates to an assignment in response to the status data received at the communications server 2. A further type of assignment may also take place, independent of the assignment discussed above, as illustrated schematically in FIG. 7 which is a flowchart representing such a process.

In FIG. 7, at a step 700, the communications server 2 acquires role group data, for example from the configurations server 4. The role group data may define categories of user roles within the set of users associated with the communication terminals 1. In the example of a broadcast studio arrangement, such roles may be "camera operator", "lighting operator", "sound technician", "director" or the like. To facilitate communication within the set of users, the communication terminals may be assigned to role groups to allow certain transmissions to be broadcast to all members of a particular role group. In FIG. 8A, three role groups, A, B and C, are defined and superimposed upon the role group structure are the non-distribution group 530, the voice distribution group 510 and the text distribution group 520. FIG. 8A therefore indicates that the assignment to a role group can be independent of the assignment to a communication distribution group by the communications server 2.

FIG. 8B shows the same set of terminals 1*a* . . . 1*i* in the same distribution amongst communication groups and role groups as in FIG. 8A, but viewed from the point of view of the communication distribution groups first, with the role groups A, B, C overlaid on top. The reason for providing this representation is to illustrate the fact that in the allocation of a terminal 1 to a role group and to a communication distribution group, the order of such allocation is immaterial, such that the end result, being a specification for an individual terminal 1 of {Role, Communication type} is the technically significant result of such an allocation process. In example embodiments, the allocation of a role group determines which user talks to which other user, and the allocation of a communication type group determines the technical manner by which such communication is allowed by the server 2 to take place.

Therefore this provides an example in which the terminal manager 220 is configured to access data (for example, from the configuration server 4) indicating a category of a user of each terminal device; and the terminal manager 220 is configured to assign a given communication terminal to a group selected in response to the category of the user of the given terminal device.

Referring now to FIGS. 9 and 10, as mentioned above, it is possible for communications to be routed via the server 2 or to be performed directly between communication terminals but under the control or oversight of the server 2.

In FIG. 9, a terminal 900 in an arbitrary first communication group is communicating a data transmission to one or more terminals 910 in an arbitrary second (different) communication group. The groups were assigned to the terminals 900, 910 by the server 2.

The communication transmission 920 is sent by the terminal 900 to the server 2 which converts the transmission 920 into a format appropriate to the second communication group of which the terminal 910 is a member, before re-transmitting 930 the transmission in the required format to the terminal(s) 910.

Note that to avoid feedback (howling) the server may act so as not to retransmit a voice or audio communication back to the particular originating terminal 1.

Therefore, FIG. 9 provides an example in which the communication terminals are configured to communicate with one another by a source terminal 900 transmitting a communication to the communications server 2, and the communications server 2 transmitting the communication to one or more destination terminals 910. Note that the destination terminals can be selected according to a role group of the form shown in FIG. 8A, but that the format of transmission to each of the recipient terminals is determined according to the communication group allocated by the terminal manager.

In FIG. 10, a terminal 1000 in the arbitrary first communication group sends a transmission 1005 28 terminal 1010 in an arbitrary second (different) communication group, the groups having been assigned by communications 1020 from the server 2. The direct communication 1005 is made under the control of the server 2, in that the server 2 controls the terminal 1000 to communicate the transmission 1005 to the terminal 1010 in a communication format appropriate to the second communication group of the terminal 1010.

FIG. 11A is a schematic flowchart illustrating aspects of the operation of the CPU 300 with respect to operation of the time controller 370. In FIG. 11A, steps drawn to the left of a broken vertical line 1100 are performed by the server 2 and steps to the right of the line 1100 are performed by a communication terminal 1.

A starting condition for the terminal 1, as indicated schematically by a step 1125, is that communications via the server 2 are inhibited (and it is noted that no restrictions are imposed at this stage on "normal" communications as a smartphone).

At a step 1110, the server 2 generates and/or acquires group and time data, at least in part in response to received status data and also potentially in response to information provided by the configurations server 4. The time data defines a time period allocated by the configuration server 4 to the performance of the collective task such as the making of a television programme in an example arrangement. For example, the time data may indicate a period as [start_date, start_time; end_date, end_time]. At a step 1120 the server 2 communicates the group data and time data to the terminal 1 which receives it at a step 1130.

At a step 1140, the terminal 1 detects, with reference to the current time indicated by the time controller 370, whether the start time defined by the time data has been reached. If not, monitoring continues and normal operations of the terminal device 1 are allowed.

When the start time has been reached, control passes to a step 1150 at which communications controlled by the server 2 are enabled and other communication operations (and potentially other operations more generally) of the communication terminal 1 are inhibited by the server sending an instruction to the communication terminal, which is to say that only communications with other terminals 1 in the set of communication terminals, under the control of the communications server 2, are allowed. A schematic step 1160 indicates that communications can proceed under the control of the communications server 2 which (at a corresponding schematic step 1170) oversees or controls those communications using the techniques described here.

At a step 1180, if the current time indicated by the time controller 370 has reached the end time defined by the time data then control passes to a step 1190. If not, the situation maintained by the steps 1150, 1160 is continued.

At the step 1190, the inhibition imposed by the step 1150 is removed and the communication terminal 1 is allowed to return to executing non-server-controlled communications. At this stage, communications under the control of the server 2 may also be inhibited again.

A reason for the arrangement of FIG. 11A is to avoid a user of the communication terminal 1 being distracted by non-task-related communications during the performance of the collective task. As an alternative to inhibiting the communication operations at the step 1150, the provision of notifications (whether "silent" or not) relating to non-server-controlled communications can be inhibited between the start time and the end time. Or in other examples, a hierarchy of inhibition could be used so that, for example, in a preparatory period leading up to the broadcast of a television programme, other communications could be allowed but notifications inhibited, whereas during the actual broadcast of a television programme all non-server-controlled communications could be inhibited. This can allow some flexibility when a live broadcast or recording is not being made, but when the live broadcast or recording is being made, all non-server-controlled communications are entirely inhibited to avoid interference with the television programme being generated.

The steps 1125, 1150, 1190 provide an example in which the terminal manager is configured to access data indicating a time period for communications between the communication terminals; and the communications controller is configured to inhibit communication between the terminal devices (for example, via the server 2) at times other than the time period.

Similarly, the steps 1150, 1190 provide an example in which the communication terminals are telephone devices having a telecommunications capability independent of the communications server; and the communications controller is configured to instruct the communication terminals to inhibit communication using the telecommunications capability within the time period.

FIG. 11B schematically represents another possible mode of operation, again representing actions by the server 2 (to the left of the line 1100) and by a terminal 1 (to the right of the line 1100). Here, rather than the communication mode being determined by a timing parameter, the starting (opening, logging in) of an application program at the terminal 1 and its subsequent ending (closure, logging out) determined the communication modes available to the terminal 1.

At a step 1105 a user of the terminal 1 starts, opens and/or logs into an application program relating to the communication system running at the terminal 1. At a step 1115 the terminal under the control of the application program registers with the server 2 which performs the registration at a step 1125.

At a step 1135 the application program controls the terminal 1 to inhibit other modes of communication, which is to say communication (such as telephone calls, text messages, e-mails or the like) other than communication under the control of the server 2. At a step 1145, cooperating with a step 1155 at the server 2, communication takes place with other terminals 1 under the control of the server 2 as discussed above.

At a step 1165 the user closes, shuts down and/or logs out of the application program. In response, at a step 1175 cooperating with a server step 1185 the application program at the terminal 1 de-registers with the server 2, and subsequently at a step 1195 the application program controls the terminal 1 to re-allow other modes of communication which were inhibited at the step 1135.

FIGS. 12A and 12B schematically illustrate a temporary allocation of membership of one or more groups to a communication terminal 1e associated with a user having temporary authorisation to join the groups.

In general terms, as described above correspondence between staff and information processing terminals 1 such as smart phones owned by the staff may also be included in participating staff information in advance, the server 2 (or the server 4) may transmit a registration request email of a smart phone in the present system to an email address of participating staff to cause an application for using the present system to be installed when the owner approves. The server 2 can register an ID and an email address in association with staff, and uniquely connect staff and an information processing terminal 1.

Referring to FIG. 12A, a group 1200 of communication terminals are associated with a particular company organisation ("company A") and/or organised into groups by a grouping operation 1210 of a company A communications server 2A.

The communication terminal 1e has identification information 1220 under the authorisation of a company B server 2B and submits an approval request 1230 to the server 2A which is selectively responded to by an approval grant message 1240 including a temporary identification 1250 (FIG. 12B) recognised by the company A server 2A. So, for the temporary assignment of the communication terminal 1e to the group 1200, the communication terminal 1e holds an identification tour 20 issued by or at least recognised by the company B server 2B and a concurrent temporary identification 1250 issued by or at least recognised by the company A server 2A.

This can provide an elegantly convenient technique for registering temporary members into existing groups in a communications system.

FIG. 13 schematically illustrates a hybrid operation, again relating to the example of a broadcasting station having multiple personnel or users U including camera operators Ud, Ue, Uf, Ug and other users Ua, Ub which need to communicate with one another for the purposes of making a broadcast program as a collective task.

The users Ua, Ub have associated communication terminals 1a, 1b which interact with the communications server 2 according to the techniques discussed above, with configuration information being provided by the broadcasting station server 4A which may be controlled by an administrator terminal 6.

The communication server is also arranged communicate with other communication systems 1300, 1310.

To achieve this, the communication server 2 can communicate with a previous communication system server 5 operating according to a legacy communications protocol. For example, a communication terminal 51 may act as a wireless relay device to provide digital packetised communication between the communications server 2 and the communication terminal 51 and analogue audio communication 53 between the communication terminal 51 and the communication system server 5. The server 5 then provides wired or wireless audio communication with operators Ud, Ue of camera equipment 50a, 50b, and with an intercom receiver server 52 which in turn communicates with a legacy system 1300. The legacy system 1300 makes use of wireless interfaces associated with camera equipment 55a, 55b and arrange to communicate to headsets worn by the users Uf, Ug so that the users Uf, Ug can perform voice communication, via the intercom receiver server 52, the server 5 and the communication terminal 51 with the server 2.

The use of the communication terminal 51 as the wireless relay device provides an elegantly convenient technique for integrating a legacy communication system into the communication system of the present embodiments.

Note that the communications system 1310 and the legacy system 1300 are categorised by the communication server 2 as being in the voice distribution group.

Referring to FIG. 14, in a situation in which a voice communication has to be sent to a recipient communication device 1 in the text distribution group, or in which a text communication has to be sent to a recipient communication device 1 in the voice distribution group, the server 2, operating according to the principles of FIG. 9, can employ a text converter 400 to convert between text and speech communications (in either direction). For example, the conversion can make use of a detection of a set of keywords in either an input text communication or an input speech communication, with the generation of the speech/text output being dependent upon the detected keywords.

Note that although in the example shown, the text converter is provided at the server 2, in other examples the server 2 could control the use of a text converter at one or more of the communication terminals 1. In general terms, the terminal manager 220 is configured to initiate 9 whether at the server 2 or at a communication terminal): the conversion of a textual communication to an audio communication for transmission to a communication terminal in the communication terminal group to which audio communications are transmitted; and the conversion of an audio communication to a textual communication for transmission to a communication terminal in the communication terminal group to which textual communications are transmitted. In examples, the server 2 itself comprises a text converter configured to convert between textual communication and audio communication, according to detection of one or more of a predetermined set of keywords.

In FIG. 15, an example of the control communication between the server 2 and a communication device 1 is provided by the communication device 1 running a so-called smartphone application 1500 (forming an example of the application referred to in the discussion of FIG. 11B above) configured to communicate with and to be responsive to the server 2. The smartphone application 1500 can provide an example of computer software executed by the CPU 300 of FIG. 3.

FIG. 16 is a schematic flowchart illustrating a computer-implemented method of operation of a communications server, the method comprising:

receiving (at a step 1600) status data indicating, for each communication terminal of a set of communication terminals, a current device status of that communication terminal;

assigning (at a step 1610) each communication terminal of the set of communication terminals to one or more communication terminal groups in dependence upon the respective status data for that communication terminal; and controlling (at a step 1620) the transmission of communications data to each of the set of communication terminals in dependence upon the respective communication terminal group to which that communication terminal is assigned.

FIG. 17 is a schematic flowchart illustrating a computer-implemented method of operation of a communication terminal, the method comprising:

generating (at a step 1700) status data indicating a current device status of the communication terminal;

transmitting (at a step 1710) the status data to the communications server; and performing (at a step 1720) communication with one or more other communication terminals via the communications server.

Information processing systems and communication systems according to embodiments of the present disclosure have been described above. Note that the present embodiments are not limited to simultaneous two-way communication in which voice conversation is possible simultaneously in a specific group, and may also be two-way communication in which simultaneous conversation is not possible, for example in an arrangement which uses a transceiver that performs communication by switching between transmission and reception using a so-called push to talk (PTT) switch. Note that even in a device which is intrinsically capable of simultaneous two-way ("duplex") communication such as a smartphone, one-way-at-a-time ("simplex") communication operation can be simulated by providing, for example, a software-generated or application-generated simulated PTT switch as for example a touch-screen icon which the user must press in order to talk.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

Respective example embodiments are disclosed by the following numbered clauses:

1. A communications server comprising:
   a data receiver configured to receive status data indicating, for each communication terminal of a set of communication terminals, a current device status of that communication terminal;
   a terminal manager configured to assign each communication terminal of the set of communication terminals to one or more communication terminal groups in dependence upon the respective status data for that communication terminal; and
   a communications controller to control the transmission of communications data to each of the set of communication terminals in dependence upon the respective communication terminal group to which that communication terminal is assigned by the terminal manager.

2. A communications server according to clause 1, in which:
   the terminal manager is configured to assign each communication terminal to a single communication terminal group selected from a set of two or more candidate communication terminal groups.

3. A communications server according to clause 1 or clause 2, in which:
   the data receiver is configured to receive the status data for a given communication terminal from the given communication terminal; and
   the current device status comprises, for the given communication terminal, at least a current data output capability of a user interface of the given device.

4. A communications server according to clause 3, in which the status data indicates, for the given communication terminal, at least one capability selected from the list consisting of:
   whether an external audio transducer is currently connected to handle audio signals for the given communication terminal;
   a current notification mode indicating the handling of user notifications by the given communication terminal; and
   whether a display screen of the given communication terminal is currently in a locked state or an unlocked state.

5. A communications server according to clause 4, in which the terminal manager is configured to assign the given communication terminal to:
   a communication terminal group to which audio communications are transmitted, when the status data indicates that an external audio transducer is currently connected to handle audio signals for the given communication terminal; or
   a communication terminal group to which textual communications are transmitted, when the status data indicates that the current notification mode is a mode using only one or both of visual and vibrational notifications and that the display screen of the given communication terminal is currently unlocked.

6. A communications server according to clause 4 or clause 5, in which the terminal manager is configured to assign the given communication terminal to a non-distribution group to which communications are not transmitted when the status data indicates that an external audio transducer is not currently connected to handle audio signals for the given communication terminal and that the display screen of the given communication terminal is currently locked.

7. A communications server according to clause 5 or clause 6, in which the terminal manager is configured to initiate:
   the conversion of a textual communication to an audio communication for transmission to a communication terminal in the communication terminal group to which audio communications are transmitted; and
   the conversion of an audio communication to a textual communication for transmission to a communication terminal in the communication terminal group to which textual communications are transmitted.

8. A communications server according to clause 7, in which the server comprises a text converter configured to convert between textual communication and audio communication, according to detection of one or more of a predetermined set of keywords.

9. A communications server according to any one of clauses 5 to 8, in which the terminal manager is configured to detect a change in the status data for the given communication terminal and to change the assignment of the given communication terminal in response to the detected change in the status data.

10. A communications server according to clause 6, in which:
the status data indicates, for the given communication terminal, whether a battery of the given communication terminal has at least a threshold charge level; and
the terminal manager is configured to assign the given communication terminal to the non-distribution group, when the status data indicates that the battery of the given communication terminal has less than the threshold charge level.

11. A communications server according to clause 5, in which:
the status data indicates, for the given communication terminal, whether the given communication terminal is in motion; and
the terminal manager is configured to assign the given communication terminal to the communication terminal group to which textual communications are transmitted, when the status data indicates that whether the given communication terminal is in motion.

12. A communications server according to clause 5, in which:
the status data indicates, for the given communication terminal, a biometric property detected for a user of the given communication terminal; and
the terminal manager is configured to assign the given communication terminal to a group selected in response to the detected biometric property of the user.

13. A communications server according to any one of the preceding clauses, in which:
the terminal manager is configured to access data indicating a category of a user of each terminal device; and
the terminal manager is configured to assign a given communication terminal to a group selected in response to the category of the user of the given terminal device.

14. A communications server according to any one of the preceding clauses, in which
the terminal manager is configured to access data indicating a time period for communications between the communication terminals; and
the communications controller is configured to inhibit communication between the terminal devices at times other than the time period.

15. A communications server according to clause 14, in which:
the communication terminals are telephone devices having a telecommunications capability independent of the communications server; and
the communications controller is configured to instruct the communication terminals to inhibit communication using the telecommunications capability within the time period.

16. A communications server according to any one of the preceding clauses, in which the communication terminals are configured to communicate with one another by a source terminal transmitting a communication to the communications server, and the communications server transmitting the communication to one or more destination terminals.

17. A communications system comprising:
a communications server according to any one of the preceding clauses; and
a set of communication terminals each configured to receive communications data and to provide status data indicating a respective current device status to the communications server.

18. A computer-implemented method of operation of a communications server, the method comprising:
receiving status data indicating, for each communication terminal of a set of communication terminals, a current device status of that communication terminal;
assigning each communication terminal of the set of communication terminals to one or more communication terminal groups in dependence upon the respective status data for that communication terminal; and
controlling the transmission of communications data to each of the set of communication terminals in dependence upon the respective communication terminal group to which that communication terminal is assigned.

19. Computer software which, when executed by a computer, causes the computer to perform the method of clause 18.

20. A non-transitory, machine-readable medium which stores computer software according to clause 19.

21. A computer-implemented method of operation of a communication terminal, the method comprising:
generating status data indicating a current device status of the communication terminal;
transmitting the status data to the communications server; and
performing communication with one or more other communication terminals via the communications server.

22. Computer software which, when executed by a computer, causes the computer to perform the method of clause 21.

23. A non-transitory, machine-readable medium which stores computer software according to clause 22.

Embodiments of the present disclosure are also described by the following set of numbered clauses:

(Clause 1)
An information processing apparatus comprising:
a control unit that acquires status information of a plurality of information processing terminals included in a group based on group setting information of voice conversation, and divides the plurality of information processing terminals into a plurality of sub-groups included in the group on a basis of the status information of each of the plurality of information processing terminals.

(Clause 2)
The information processing apparatus according to clause 1, wherein the control unit performs control to divide the group created on a basis of the group setting information into sub-groups of different distribution forms in accordance with availability of voice conversation based on the status information of the information processing terminals.

(Clause 3)
The information processing apparatus according to clause 2, wherein the sub-groups of different distribution forms are at least one of a voice distribution group, a text distribution group, or a non-distribution group.

(Clause 4)
The information processing apparatus according to clause 3,
wherein the control unit performs control such that voice conversation within the group is converted into text data and is distributed to the information processing terminals of the text distribution group.

(Clause 5)
The information processing apparatus according to clause 1, wherein the status information is sensing data detected by the information processing terminals.

(Clause 6)
The information processing apparatus according to clause 5, wherein the sensing data is data related to users' wearing states of headsets connected to the information processing terminals.

(Clause 7)
The information processing apparatus according to clause 5, wherein the sensing data is positional information of the information processing terminals.

(Clause 8)
The information processing apparatus according to clause 1, wherein the status information is information regarding device states of the information processing terminals.

(Clause 9)
The information processing apparatus according to clause 8, wherein the information regarding the device states is information regarding states of display screens of the information processing terminals.

(Clause 10)
The information processing apparatus according to clause 8, wherein the information regarding the device states is information regarding setting modes of the information processing terminals.

(Clause 11)
The information processing apparatus according to clause 8, wherein the information regarding the device states is battery residual amounts of the information processing terminals.

(Clause 12)
The information processing apparatus according to clause 1, wherein the status information is time information.

(Clause 13)
The information processing apparatus according to clause 2,
wherein the control unit temporarily adds an unregistered information processing terminal to the created group in accordance with an approval request.

(Clause 14)
An information processing method comprising:
acquiring, by a processor, status information of a plurality of information processing terminals included in a group based on group setting information of voice conversation; and
dividing, by the processor, the plurality of information processing terminals into a plurality of sub-groups included in the group on a basis of the status information of each of the plurality of information processing terminals.

(Clause 15)
A program causing a computer to function as
a control unit that acquires status information of a plurality of information processing terminals included in a group based on group setting information of voice conversation, and divides the plurality of information processing terminals into a plurality of sub-groups included in the group on a basis of the status information of each of the plurality of information processing terminals.

(Clause 16)
A program causing a computer to function as
a control unit that, when information indicating that a plurality of information processing terminals included in a group based on group setting information of voice conversation are divided into a plurality of sub-groups included in the group on a basis of status information of each of the plurality of information processing terminals is received from an information processing apparatus, controls an output form of voice conversation distributed within the group to a user in accordance with a sub-group into which the information processing terminals are divided.

(Clause 17)
The program according to clause 16,
wherein the control unit performs control such that the distributed voice conversation is converted into text and displayed on a display unit in a case in which the information processing terminals are divided into a text distribution group among the sub-groups.

The invention claimed is:
1. A communications server, comprising:
a data receiver configured to receive status data for each communication terminal of a set of communication terminals, wherein
the status data of a first communication terminal of the set of communication terminals is received from the first communication terminal,
the status data of the first communication terminal indicates a current device status of the first communication terminal,
the current device status comprises at least one current data output capability of a user interface of the first communication terminal, and
the at least one current data output capability is selected from a list consisting of:
whether an external audio transducer is currently connected to handle audio signals for the first communication terminal,
a current notification mode that indicates handling of user notifications by the first communication terminal, and
whether a display screen of the first communication terminal is currently in a locked state or an unlocked state;
a terminal manager configured to:
assign each communication terminal of the set of communication terminals to at least one communication terminal group based on respective status data for each of the communication terminal, wherein
the first communication terminal is assigned to one of
a first communication terminal group to which audio communications are transmitted, when the status data indicates that the external audio transducer is currently connected to handle the audio signals for the first communication terminal, or
a second communication terminal group to which textual communications are transmitted, when the status data indicates that the current notification mode is a mode using only at least one of a visual notification or a vibrational notification and that the display screen of the first communication terminal is currently unlocked; and
a communications controller configured to control transmission of communications data to each of the set of communication terminals based on the respective communication terminal group to which that communication terminal is assigned by the terminal manager.

2. The communications server according to claim 1, wherein the terminal manager is further configured to assign the first communication terminal to a non-distribution group to which communications are not transmitted when the status data indicates that the external audio transducer is not currently connected to handle the audio signals for the first communication terminal and that the display screen of the first communication terminal is currently locked.

3. The communications server according to claim 1, wherein the terminal manager is further configured to:
initiate conversion of a textual communication to an audio communication for transmission to a second communication terminal in the first communication terminal group to which the audio communications are transmitted; and
initiate conversion of the audio communication to the textual communication for transmission to a third communication terminal in the second communication terminal group to which the textual communications are transmitted.

4. The communications server according to claim 3, wherein the communications server further comprises a text converter configured to convert between the textual communication and the audio communication, based on detection of at least one specific set of keywords.

5. The communications server according to claim 1, wherein the terminal manager is further configured to:
detect a change in the status data for the first communication terminal; and
change the assignment of the first communication terminal based on the detected change in the status data.

6. The communications server according to claim 2, wherein
the status data further indicates, for the first communication terminal, whether a battery of the first communication terminal has at least a threshold charge level, and
the terminal manager is further configured to assign the first communication terminal to the non-distribution group, when the status data indicates that the battery of the first communication terminal has less than the threshold charge level.

7. The communications server according to claim 1, wherein
the status data further indicates, for the first communication terminal, whether the first communication terminal is in motions, and
the terminal manager is further configured to assign the first communication terminal to the second communication terminal group to which the textual communications are transmitted, when the status data indicates that whether the first communication terminal is in motion.

8. The communications server according to claim 1, wherein
the status data further indicates, for the first communication terminal, a biometric property detected for a user of the first communication terminal, and
the terminal manager is further configured to assign the first communication terminal to a third communication terminal group selected in response to the detected biometric property of the user.

9. The communications server according to claim 1, wherein the terminal manager is further configured to:
access data indicating a category of a user of each terminal device of a set of terminal devices; and
assign a specific communication terminal to a third communication terminal group selected based on the category of the user of a specific terminal device.

10. The communications server according to claim 1, wherein
the terminal manager is further configured to access data indicating a first time period for communications between each communication terminal of the set of communication terminal, and
the communications controller is further configured to inhibit communication between each terminal device of the set of terminal devices at a second time period, the second time period is different from the first time period.

11. The communications server according to claim 10, wherein
each communication terminal of the set of the communication terminals is a telephone device having a telecommunications capability independent of the communications server, and
the communications controller is further configured to instruct each communication terminal of the set of communication terminals to inhibit communication using the telecommunications capability within the first time period.

12. The communications server according to claim 1, wherein the set of the communication terminals are configured to communicate with one another by a source terminal of the set of the communication terminals transmitting a communication to the communications server, and the communications server transmitting the communication to at least one destination terminal of the set of the communication terminals.

13. A communications system, comprising:
a communications server; and
a set of communication terminals each configured to receive communications data and to provide status data indicating a respective current device status to the communications server, wherein
the communication server, comprising:
a data receiver configured to receive status data for each communication terminal of a set of communication terminals, wherein
the status data of a specific communication terminal of the set of communication terminals is received from the specific communication terminal,
the status data of the specific communication terminal indicates a current device status of the specific communication terminal,
the current device status comprises at least one current data output capability of a user interface of the specific communication terminal, and
the at least one current data output capability is selected from a list consisting of:
whether an external audio transducer is currently connected to handle audio signals for the specific communication terminal,
a current notification mode that indicates handling of user notifications by the specific communication terminal, and whether a display screen of the specific communication terminal is currently in a locked state or an unlocked state;
a terminal manager configured to:
assign each communication terminal of the set of communication terminals to at least one communication terminal group based on respective status data for each of the communication terminal, wherein the specific communication terminal is assigned one of
a first communication terminal group to which audio communications are transmitted, when the status data indicates that the external audio transducer is currently connected to handle the audio signals for the specific communication terminal, or
a second communication terminal group to which textual communications are transmitted, when the status data indicates that the current notification mode is a mode using only at least one of a visual notification or a vibrational notification and that the display screen of the specific communication terminal is currently unlocked; and
a communications controller configured to control transmission of communications data to each of the set of communication terminals based on the respective communication terminal group to which that communication terminal is assigned by the terminal manager.

14. A computer-implemented method of operation of a communications server, the method comprising:
receiving status data for each communication terminal of a set of communication terminals, wherein
the status data of a specific communication terminal of the set of communication terminals is received from the specific communication terminal,
the status data of the specific communication terminal indicates a current device status of the specific communication terminal,
the current device status comprises at least one current data output capability of a user interface of the specific communication terminal, and
the at least one current data output capability is selected from a list consisting of:
whether an external audio transducer is currently connected to handle audio signals for the specific communication terminal,
a current notification mode that indicates handling of user notifications by the specific communication terminal, and
whether a display screen of the specific communication terminal is currently in a locked state or an unlocked state;
assigning each communication terminal of the set of communication terminals to at least one communication terminal group based on respective status data for each of the communication terminal, wherein
the specific communication terminal is assigned one of
a first communication terminal group to which audio communications are transmitted, when the status data indicates that the external audio transducer is currently connected to handle the audio signals for the specific communication terminal, or
a second communication terminal group to which textual communications are transmitted, when the status data indicates that the current notification mode is a mode using only at least one of a visual notification or a vibrational notification and that the display screen of the specific communication terminal is currently unlocked; and
controlling transmission of communications data to each of the set of communication terminals based on the respective communication terminal group to which that communication terminal is assigned.

15. A non-transitory computer-readable medium having stored thereon, computer-executable instructions which, when executed by a processor, cause the processor to execute operations, the operations comprising:
receiving status data for each communication terminal of a set of communication terminals, wherein
the status data of a specific communication terminal of the set of communication terminals is received from the specific communication terminal,
the status data of the specific communication terminal indicates a current device status of the specific communication terminal,
the current device status comprises at least one current data output capability of a user interface of the specific communication terminal, and
at least one current data output capability is selected from a list consisting of:
whether an external audio transducer is currently connected to handle audio signals for the specific communication terminal,
a current notification mode that indicates handling of user notifications by the specific communication terminal, and
whether a display screen of the specific communication terminal is currently in a locked state or an unlocked state;
assigning each communication terminal of the set of communication terminals to at least one communication terminal group based on respective status data for each of the communication terminal, wherein
the specific communication terminal is assigned one of
a first communication terminal group to which audio communications are transmitted, when the status data indicates that the external audio transducer is currently connected to handle the audio signals for the specific communication terminal, or
a second communication terminal group to which textual communications are transmitted, when the status data indicates that the current notification mode is a mode using only at least one of a visual notification or a vibrational notification and that the display screen of the specific communication terminal is currently unlocked; and
controlling transmission of communications data to each of the set of communication terminals based on the respective communication terminal group to which that communication terminal is assigned.

16. A computer-implemented method of operation of a specific communication terminal, the method comprising:
generating status data indicating a current device status of the specific communication terminal;
transmitting the status data to a communications server, wherein
the current device status comprises at least one current data output capability of a user interface of the specific communication terminal, and
the at least one current data output capability is selected from a list consisting of:

whether an external audio transducer is currently connected to handle audio signals for the specific communication terminal,
a current notification mode that indicates handling of user notifications by the specific communication terminal, and
whether a display screen of the specific communication terminal is currently in a locked state or an unlocked state;
assigning the specific communication terminal to at least one communication terminal group based on the status data for the specific communication terminal, wherein the specific communication terminal is assigned one of:
a first communication terminal group to which audio communications are transmitted, when the status data indicates that the external audio transducer is currently connected to handle the audio signals for the specific communication terminal, or
a second communication terminal group to which textual communications are transmitted, when the status data indicates that the current notification mode is a mode using only at least one of a visual notification or a vibrational notification and that the display screen of the specific communication terminal is currently unlocked;
controlling transmission of communications data to the specific communication terminal based on the assigned at least one communication terminal group; and
performing communication with at least one communication terminal via the communications server, wherein the specific communication terminal is different from the at least one communication terminal.

17. A communication system, comprising:
a central processing unit (CPU) configured to:
generate status data indicating a current device status of a specific communication terminal;
transmit the generated status data to a communications server, wherein
the status data of the specific communication terminal indicates a current device status of the specific communication terminal,
the current device status comprises at least one current data output capability of a user interface of the specific communication terminal, and
at least one current data output capability is selected from a list consisting of:
whether an external audio transducer is currently connected to handle audio signals for the specific communication terminal,
a current notification mode that indicates handling of user notifications by the specific communication terminal, and
whether a display screen of the specific communication terminal is currently in a locked state or an unlocked state;
assign the specific communication terminal to at least one communication terminal group based on the status data for the specific communication terminal, wherein
the specific communication terminal is assigned one of
a first communication terminal group to which audio communications are transmitted, when the status data indicates that the external audio transducer is currently connected to handle the audio signals for the specific communication terminal, or
a second communication terminal group to which textual communications are transmitted, when the status data indicates that the current notification mode is a mode using only at least one of a visual notification or a vibrational notification and that the display screen of the specific communication terminal is currently unlocked;
control transmission of communications data to the specific communication terminal based on the assigned at least one communication terminal group; and
perform communication with at least one communication terminal via the communications server, wherein the specific communication terminal is different from the at least one communication terminal.

18. A non-transitory, computer-readable medium having stored thereon, computer-executable instructions which, when executed by a processor, cause the processor to execute operations, the operations comprising:
generating status data indicating a current device status of a specific communication terminal;
transmitting the status data to a communications server, wherein
the status data of the specific communication terminal indicates a current device status of the specific communication terminal,
the current device status comprises at least one current data output capability of a user interface of the specific communication terminal, and
at least one current data output capability is selected from a list consisting of:
whether an external audio transducer is currently connected to handle audio signals for the specific communication terminal,
a current notification mode that indicates handling of user notifications by the specific communication terminal, and
whether a display screen of the specific communication terminal is currently in a locked state or an unlocked state;
assigning the specific communication terminal to at least one communication terminal group based on the status data for the specific communication terminal, wherein the specific communication terminal is assigned one of:
a first communication terminal group to which audio communications are transmitted, when the status data indicates that the external audio transducer is currently connected to handle the audio signals for the specific communication terminal, or
a second communication terminal group to which textual communications are transmitted, when the status data indicates that the current notification mode is a mode using only at least one of a visual notification or a vibrational notification and that the display screen of the specific communication terminal is currently unlocked;
controlling transmission of communications data to the specific communication terminal based on the assigned at least one communication terminal group; and
performing communication with at least one communication terminal via the communications server, wherein the specific communication terminal is different from the at least one communication terminal.

* * * * *